United States Patent
Spool et al.

(10) Patent No.: US 7,280,893 B2
(45) Date of Patent: Oct. 9, 2007

(54) BUSINESS MANAGEMENT SYSTEM AND METHOD FOR A DEREGULATED ELECTRIC POWER MARKET

(75) Inventors: Peter R. Spool, Highland Park, NJ (US); Stephen Masticola, Kingston, NJ (US); Dilip Soni, Kingston, NJ (US); William Landi, Hamilton, NJ (US); William Hasling, Princeton Junction, NJ (US)

(73) Assignee: Siemens Power Generation, Inc., Orlando, FL (US)

( * ) Notice: Subject to any disclaimer, the term of this patent is extended or adjusted under 35 U.S.C. 154(b) by 653 days.

(21) Appl. No.: 10/143,107

(22) Filed: May 10, 2002

(65) Prior Publication Data

US 2003/0093332 A1 May 15, 2003

Related U.S. Application Data

(60) Provisional application No. 60/290,168, filed on May 10, 2001.

(51) Int. Cl.
*G06F 19/00* (2006.01)

(52) U.S. Cl. ............... 700/291; 700/286; 700/293; 700/295; 700/297; 702/61; 705/412

(58) Field of Classification Search ............ 702/61
See application file for complete search history.

(56) References Cited

U.S. PATENT DOCUMENTS

| | | | | |
|---|---|---|---|---|
| 6,529,839 | B1 * | 3/2003 | Uggerud et al. | 702/61 |
| 6,681,156 | B1 * | 1/2004 | Weiss | 700/291 |
| 6,785,592 | B1 * | 8/2004 | Smith et al. | 700/291 |
| 6,879,884 | B2 * | 4/2005 | Takeuchi et al. | 700/291 |
| 6,925,385 | B2 * | 8/2005 | Ghosh et al. | 702/14 |
| 2003/0009401 | A1 * | 1/2003 | Ellis | 705/35 |
| 2003/0216971 | A1 * | 11/2003 | Sick et al. | 705/26 |
| 2004/0078153 | A1 * | 4/2004 | Bartone et al. | 702/57 |

* cited by examiner

*Primary Examiner*—Lynda Jasmin

(57) ABSTRACT

A business management method with interaction between an electrical energy supplier and a plurality of customer energy consumers includes the consumers providing respective electricity load profiles to the energy supplier. The method also includes the energy supplier aggregating the respective projected electricity load profiles. The method further includes the energy supplier making decisions based on the respective projected electricity load profiles on any of the consumers bidding on additional power, offering excess power on energy exchanges, and offering specials discounts to favored consumers. The method is likewise applicable to other commodities such as a water supply, fuel gas supply, or the like.

3 Claims, 58 Drawing Sheets

Role-Based Portal Concept

Example: Role-Based Portal for Production Engineer

Fig. 21

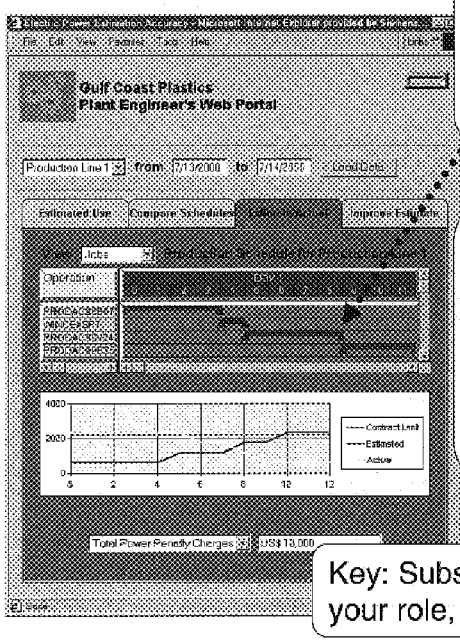

Production schedules are visually integrated with graphed production engineering information (from many possible sources)

Other roleplayers include:
- Comptroller
- Sales
- Maintenance manager
- *Customers (via extranet)*
- *Energy suppliers*
- *Other trading partners*

Key: Subscribe to the information you need in your role, but *leave out the irrelevant clutter*

Estimating Energy Usage

Three XML base documents are referenced:
- Past production schedules
- Past load profile data
- Daily courses They form four XML derived documents:
- Estimated energy use for production
- Estimated energy cost
- Actual energy cost
- Variance from the estimate Information Integration and Base Document Layers Information Integration Architecture – Summary Structural View At the ESCo: A Greater Supply than Needed The ESCo Offers a Special Tariff to Plastics Customer Circle Production Engineer Learns of a Special on Energy Production Engineer Adjusts Schedule
But a Maintenance Task Conflicts Production Engineer Compares Proposed Schedules Maintenance Engineer is Asked to Defer a Task Production Engineer Gets the Response

Sales Department Considers Production Engineer's Question About Early Delivery
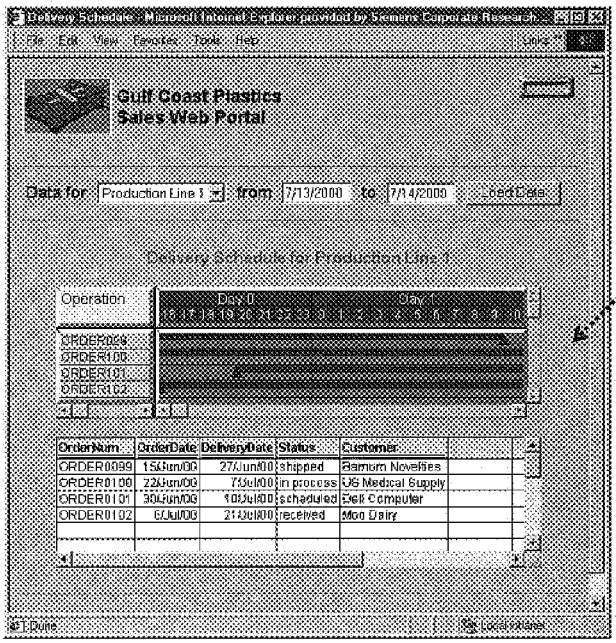
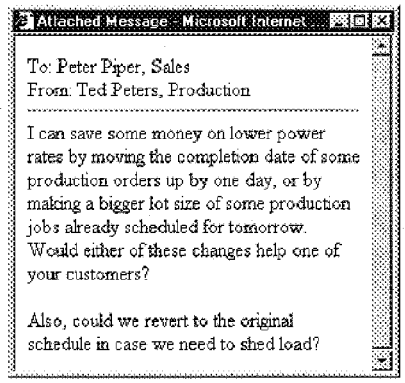
*Fig. 38*

Sales Department Responds to Production Engineer
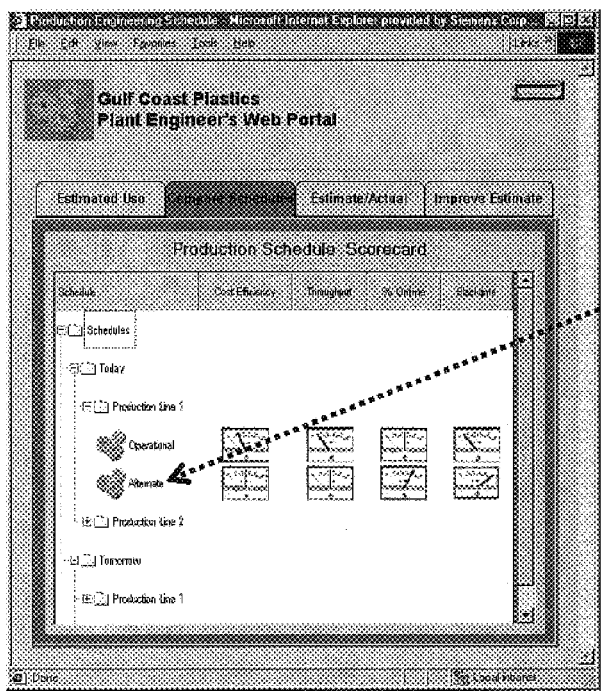
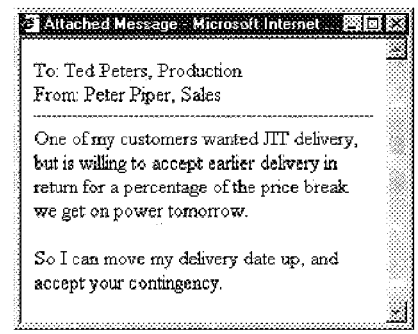
Fig. 39

ESCo's Special is Accepted & Aggregate Load Estimate Increases

Production Engineer Reserves Special Rate and Updates Schedule...
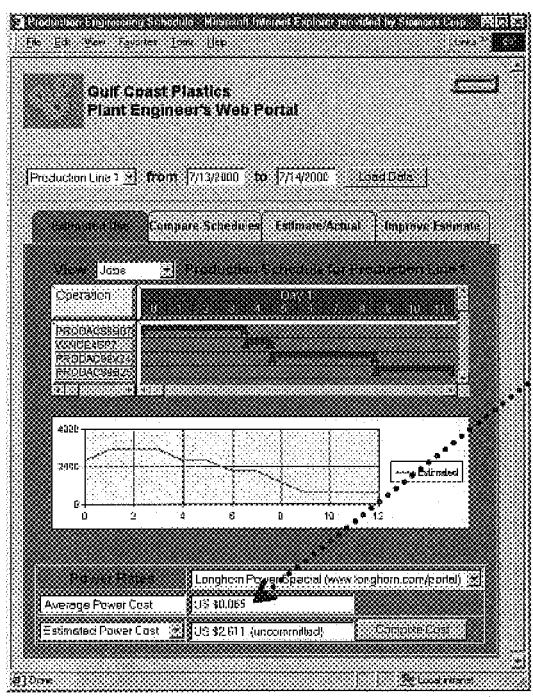
*Fig. 41*
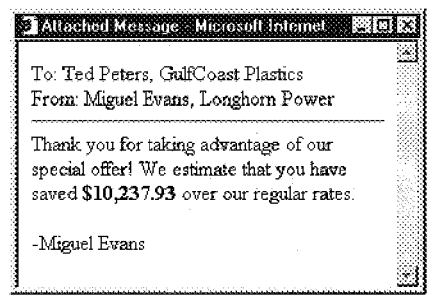

Longhorn Power Needs to Shed Load
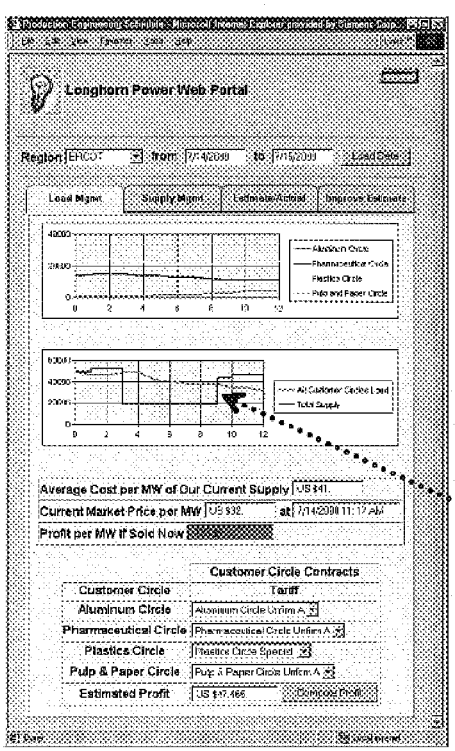
*Fig. 42*
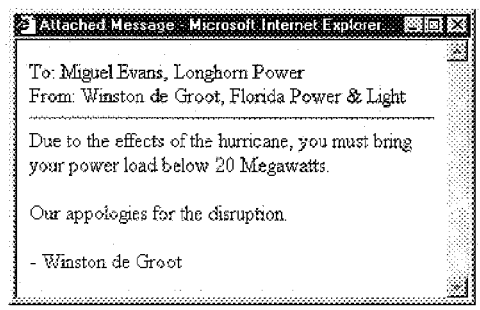

Leading to a Need for Gulf Coast to Shed Load!
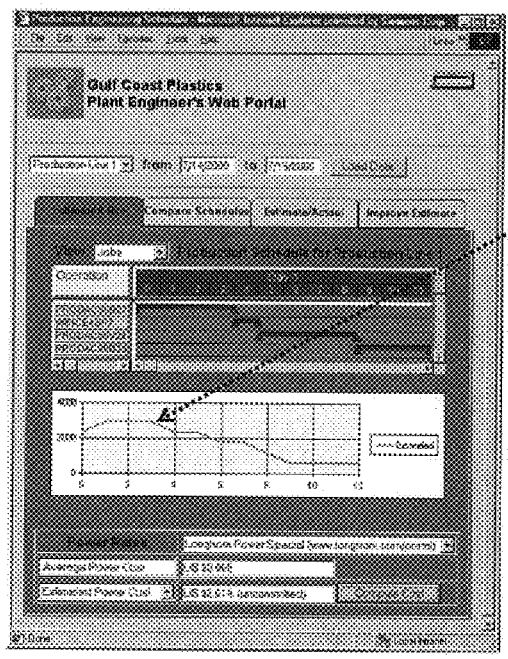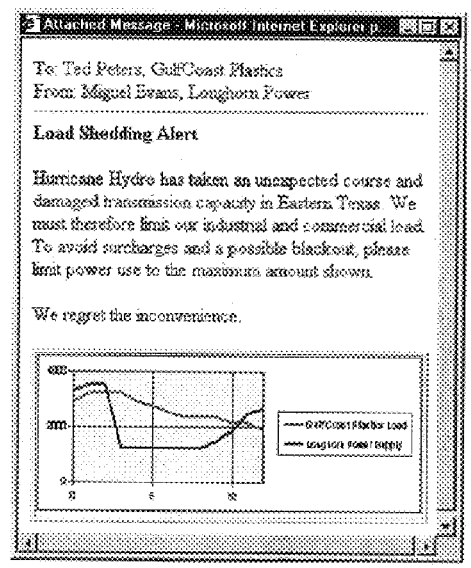
*Fig. 43*

Production Engineer Asks Sales Department
About Delaying Order Delivery

Changes to Delivery Schedule by Sales Not Enough
...Gulf Coast *Still* Needs to Shed *More* Load!!!

Production Engineer Asks Maintenance Engineer
to Reschedule a Task

Information Integration Provides the Solution

The Projected Load Shedding Results at Longhorn Power

Underestimation Causes Penalty Charges
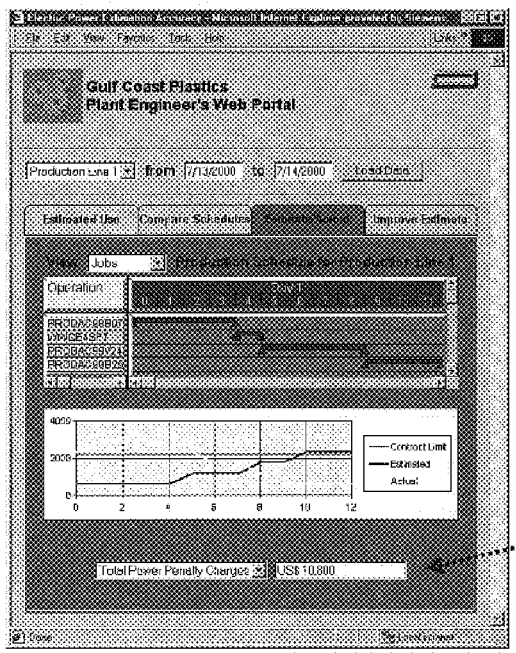
*Fig. 49*
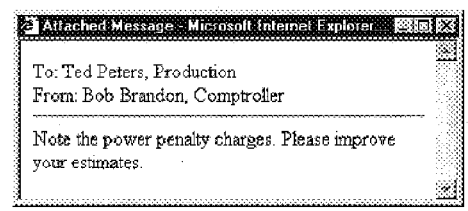

Production Engineer Uses Power Uncertainty Information
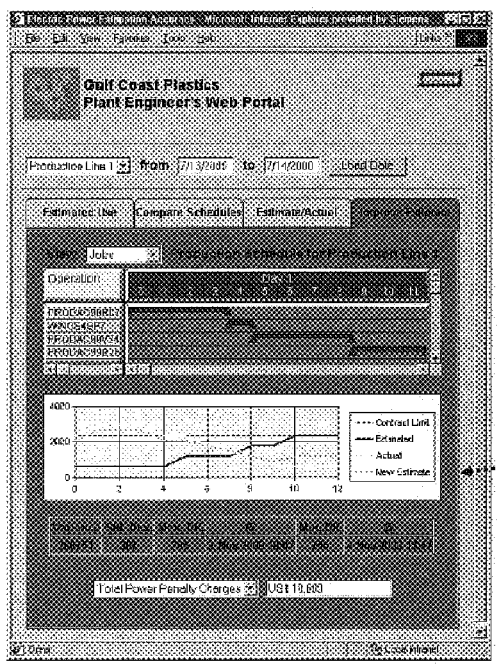
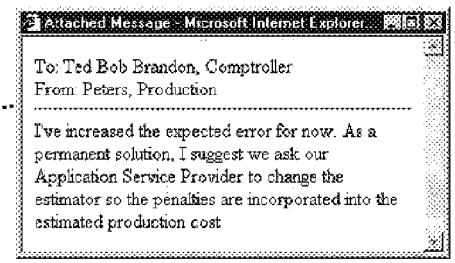
*Fig. 50*

Underestimation Incurs Frequent Penalties
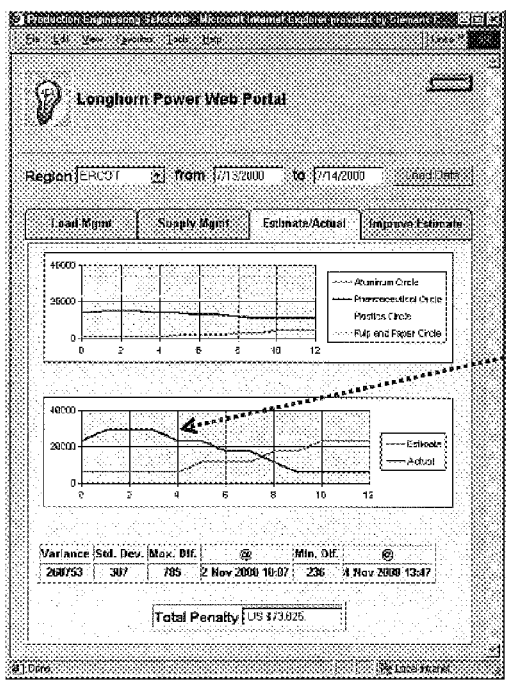
*Fig. 51*
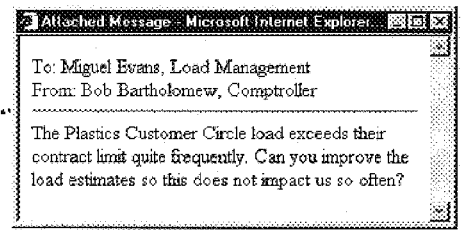

Recomputed Error Bounds Provide Reduced Risk
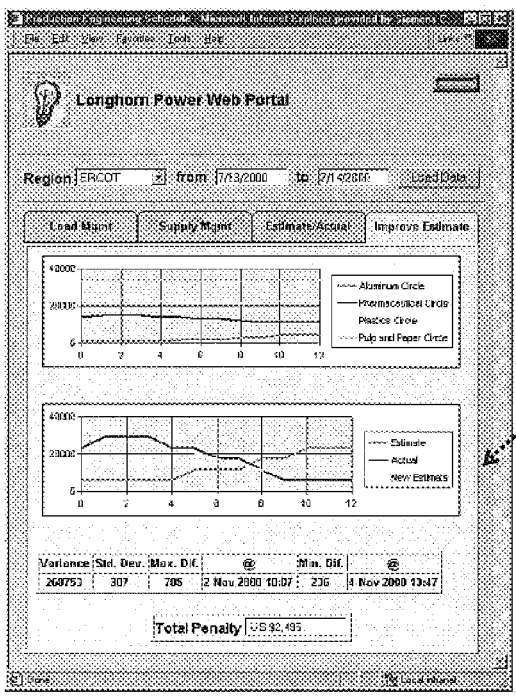
*Fig. 52*
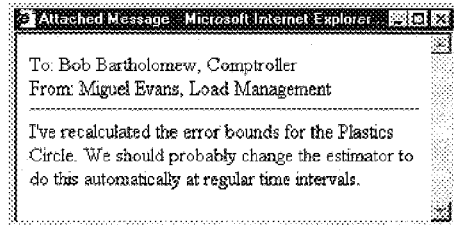

Energy Supplier uses Customer Load Estimates to Reduce its Risk

BUSINESS MANAGEMENT SYSTEM AND METHOD FOR A DEREGULATED ELECTRIC POWER MARKET

Reference is hereby made to copending Provisional Application No. 60/290,168 filed May 10, 2001, entitled INTEGRATED ENERGY E-BUSINESS SERVICES in the name of Spool et al., and of which priority is claimed and whereof the disclosure is hereby incorporated herein by reference.

Reference is made to the following patent applications by the same inventors as the present application and being filed on the same date as the present application and whereof the disclosure is hereby incorporated herein by reference:

BUSINESS MANAGEMENT SYSTEM AND METHOD FOR A DEREGULATED ELECTRIC POWER MARKET USING COOPERATIVELY PRODUCED ESTIMATES;

BUSINESS MANAGEMENT SYSTEM AND METHOD FOR A DEREGULATED ELECTRIC POWER MARKET USING SUPPLIERS' SPECIAL OFFERS;

BUSINESS MANAGEMENT SYSTEM AND METHOD FOR A DEREGULATED ELECTRIC POWER MARKET USING CONSUMER SELECTED SPECIAL OFFERS;

BUSINESS MANAGEMENT SYSTEM AND METHOD FOR A DEREGULATED ELECTRIC POWER MARKET IN A SHORTAGE SITUATION;

BUSINESS MANAGEMENT SYSTEM AND METHOD FOR A DEREGULATED ELECTRIC POWER MARKET USING CONSUMER SITE ANOMALY DETECTION;

BUSINESS MANAGEMENT SYSTEM AND METHOD FOR A DEREGULATED ELECTRIC POWER MARKET USING ONLINE DIAGNOSTIC SERVICES;

BUSINESS MANAGEMENT SYSTEM AND METHOD FOR A DEREGULATED ELECTRIC POWER MARKET USING CUSTOMER CIRCLES AGGREGATION;

BUSINESS MANAGEMENT SYSTEM AND METHOD FOR A DEREGULATED ELECTRIC POWER MARKET WITH SHARING OF SUPPLY CHAIN DATA; and BUSINESS MANAGEMENT SYSTEM AND METHOD FOR A DEREGULATED ELECTRIC POWER MARKET USING WORKSPACE PORTALS.

The present invention relates to management systems utilizing electrical communications and information exchange for optimizing a business operation and, more particularly, to business management systems for optimizing operations in a deregulated electrical power and energy market, utilizing electronic information exchange, optionally including communications on the Internet, World Wide Web, e-Business networks, intranets, wireless nets, local area networks, and similar facilities.

In a deregulated electric energy market, many electric utility companies that previously included an integrated range of capabilities, including electric power generation, transmission, and distribution, have separated and are expected in the future to separate these capabilities into different companies: electric power generation companies (GenCos), electric power transmission companies (TransCos), electric power distribution companies (DisCos). Additional roles have come to exist as a result of the buying and selling of electric power and transmission capacity. Such additional roles may (remove "may") include electric power exchanges where the energy trading takes place at the wholesale level, Independent Systems Operators (ISOs) that manage the trading in transmission capacity, and resellers that buy electric power and then resell it to others, some of which are electric power consumers. Additionally, once electric power has been purchased, space or capacity for its transmission must be reserved from the ISOs or owners of electric power transmission lines. DisCos may also be resellers, or resellers that are not DisCos may pay a DisCo for the right to deliver electric power over lines owned by the DisCos.

It will also be understood that the term "electricity" as hereinafter used, generally encompasses the terms electrical energy and/or electric power, as will be apparent from the context. Electrical consumers will typically pay separate charges for the electric power itself, the transmission of the electricity from where it is generated to the local geographical area where it is to be consumed, and the distribution of the electricity to its final consumption point. Money flow in the deregulated market would look like something like the chart shown in FIG. 1, in which the abbreviations used are as defined above.

Due to the retiring of old generation capacity, uncertainties concerning deregulation, and other factors, certain forecasts predict insufficient electric power generation capacity to meet peak demands for some time to come. Likewise, electric power transmission capacity is forecast to be insufficient to meet peak demands for the foreseeable future due to uncertainties concerning deregulation and the lack of rights-of-way in many regions for additional transmission capacity to be built. Particularly on especially hot days in summer when air-conditioning power demands are high, insufficient local power generation capacity and congestion on power transmission lines to other regions typically results in demand exceeding the available supply. As a result of such conditions, the cost of electric power and the cost of transmission capacity have reached peak prices two orders of magnitude higher than their average prices. For example, during early July 1998, prices went from less than $50 per Megawatt-Hour (MWh) to over $7,000 per MWh. Several energy service companies (ESCos) went bankrupt trying to buy electricity to meet their electric power contracts. Effective risk management has taken on new importance as a result.

Deregulation offers great opportunity in the energy market for both suppliers and customers, but it is herein recognized that:

C&I (Commercial and Industrial) energy customers cannot easily take advantage of short-term price fluctuations Energy customers cannot easily respond to restrictions on or shortages in energy supply ESCOs' ability to shut down or control customers' equipment is not appealing to most energy customers.

Energy Customers cannot respond quickly to adapt their energy demand optimally in the presence of voluntary (with price advantages) or involuntary curtailments ESCOs assume huge financial risks due to price fluctuations and inability to control energy demands.

In accordance with another aspect of the present invention, a business management method with interaction between an electrical energy supplier and a plurality of customer energy consumers, wherein the method comprises the steps of the consumers providing respective electricity load profiles to the energy supplier; the energy supplier aggregating the respective projected electricity load profiles; and the energy supplier making decisions based on the respective projected electricity load profiles on any of: bidding on additional power, offering excess power on energy exchanges, and offering specials discounts to favored consumers.

In accordance with another aspect of the present invention, a business management method includes a step of the energy supplier monitoring electric power consumption meter data.

In accordance with another aspect of the present invention, a business management method includes a step of the energy supplier utilizing data from the monitoring for modifying the respective projected electricity load profiles.

In accordance with another aspect of the present invention, a business management method includes a step, upon a finding of significant modifying of the profiles, of sharing information on the significant modifying of the profiles between any of the electrical energy supplier and the plurality of customer energy consumers.

In accordance with another aspect of the present invention, a business management method includes a step, upon a finding of significant modifying of the profiles, of sharing information on the significant modifying of the profiles with third parties.

In accordance with another aspect of the present invention, a business management system with interaction between an electrical energy supplier and a plurality of customer energy consumers having respective electrical load units which consume electrical power, wherein the system comprises: a Web site operated by the electrical energy supplier for providing information to customers about daily courses offered for the morrow through a customer portal site; Web browser apparatus available to respective ones of the customer energy consumers for accessing the customer portal site; computer apparatus for generating a set of lowest cost schedules for one or more of the daily courses, taking into consideration historical electricity use data by each of the electrical load units, inventory information, and a list of the customer energy consumers' pending orders; and apparatus for comparing the schedules and presenting information thereon on the Web browser to an operator for enabling a judgment based selection of a desirable schedule.

In accordance with another aspect of the present invention, a business management system with interaction between an electrical energy supplier and a plurality of customer energy consumers having respective electrical load units which consume electrical power while in a productive mode of operation and whereof a subset requires maintenance with varying degrees of urgency, comprises: a Web site operated by the electrical energy supplier for providing information to customers about daily courses offered for the morrow through a customer portal site; Web browser apparatus available to respective ones of the customer energy consumers for accessing the customer portal site; computer apparatus for generating a set of lowest cost schedules for one or more of the daily courses, taking into consideration historical electricity use data by each of the electrical load units, inventory information, and a list of the customer energy consumers' pending orders; and apparatus for comparing the schedules and presenting information thereon on the Web browser to an operator for enabling a judgment based selection of a desirable schedule and, in the event that a low cost power is available from the electrical energy supplier, selectively postponing maintenance subject to the degree of urgency so as to allow ones of the electrical load units to operate in the productive mode of operation while the low cost power continues to be available.

In accordance with another aspect of the present invention, a business management method with interaction between a utility supplier wherein the utility is one of electric, water, and fuel gas supply, and a plurality of customer utility consumers, comprises the steps of: the consumers providing respective utility usage load profiles to the utility supplier; the utility supplier aggregating the respective projected utility usage profiles; and the utility supplier making decisions based on the respective projected utility usage profiles on any of: bidding on additional quantities, offering excess quantities on quantity exchanges, and offering specials discounts to favored consumers.

In accordance with another aspect of the present invention, a business management system with interaction between a utility supplier, the utility comprising any of electricity, water supply, and fuel gas, and a plurality of customer utility usage consumers having respective utility usage load units which consume from the utility while in a productive mode of operation and whereof a subset requires maintenance with varying degrees of urgency, comprises: a Web site operated by the utility supplier for providing information to customers about daily courses offered for the morrow through a customer portal site; Web browser apparatus available to respective ones of the customer utility consumers for accessing the customer portal site; computer apparatus for generating a set of lowest cost schedules for one or more of the daily courses, taking into consideration historical utility usage data by each of the utility usage load units, inventory information, and a list of the customer utility usage consumers' pending orders; and apparatus for comparing the schedules and presenting information thereon on the Web browser to an operator for enabling a judgment based selection of a desirable schedule and, in the event that a low cost for the utility is available from the utility supplier, selectively postponing maintenance subject to the degree of urgency so as to allow ones of the utility usage load units to operate in the productive mode of operation while the low cost for the utility continues to be available.

In accordance with another aspect of the present invention, a business management method with interaction between an electrical energy supplier and a plurality of customer energy consumers comprises the steps of: the consumers providing respective electricity load profiles to the energy supplier; the energy supplier aggregating the respective projected electricity load profiles; and the energy supplier making decisions based on the respective projected electricity load profiles on any of bidding on additional power, offering excess power on energy exchanges, and offering specials discounts to favored consumers. The method is likewise applicable to other commodities such as a water supply, fuel gas supply, or the like.

The invention will be more fully understood from the following detailed description of preferred embodiments, in conjunction with the Drawing, in which various figures provide information helpful to an understanding of the invention and illustrate embodiments in accordance with the principles of the invention, as follows.

Figure 3:
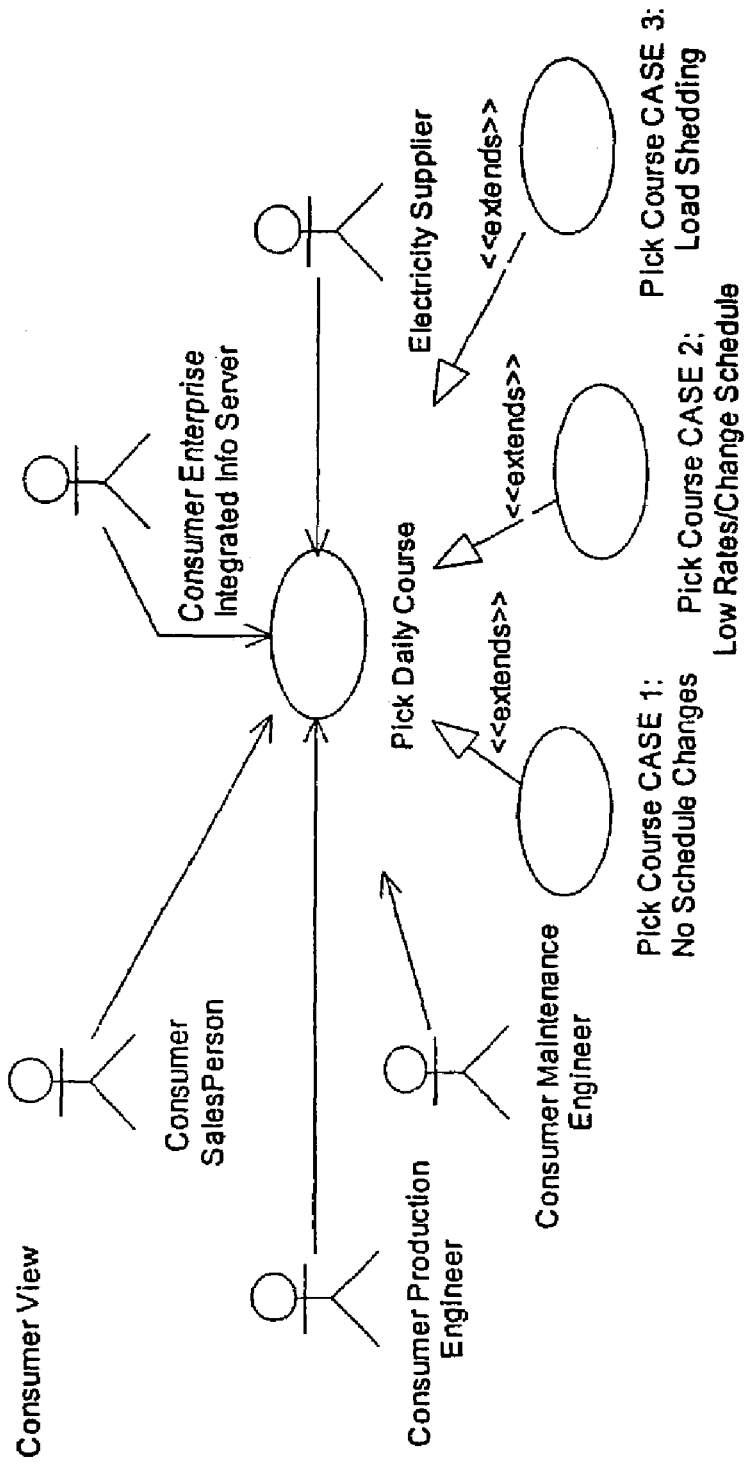
FIG. 3 shows an overview UML Use Case diagram for power consumers, including three different cases and the major roles participating in them.
Figure 9:
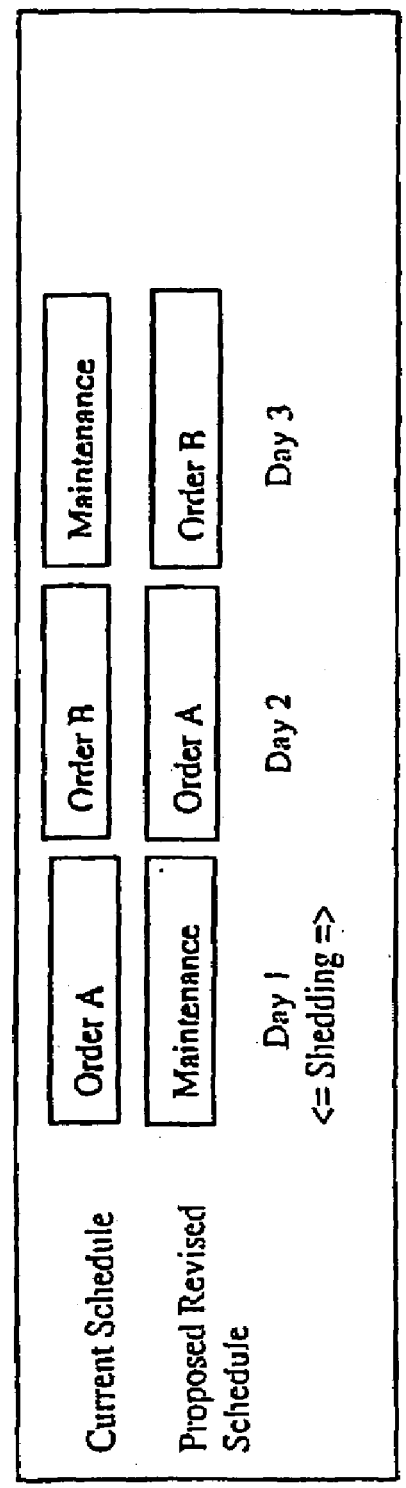
Figure 10:
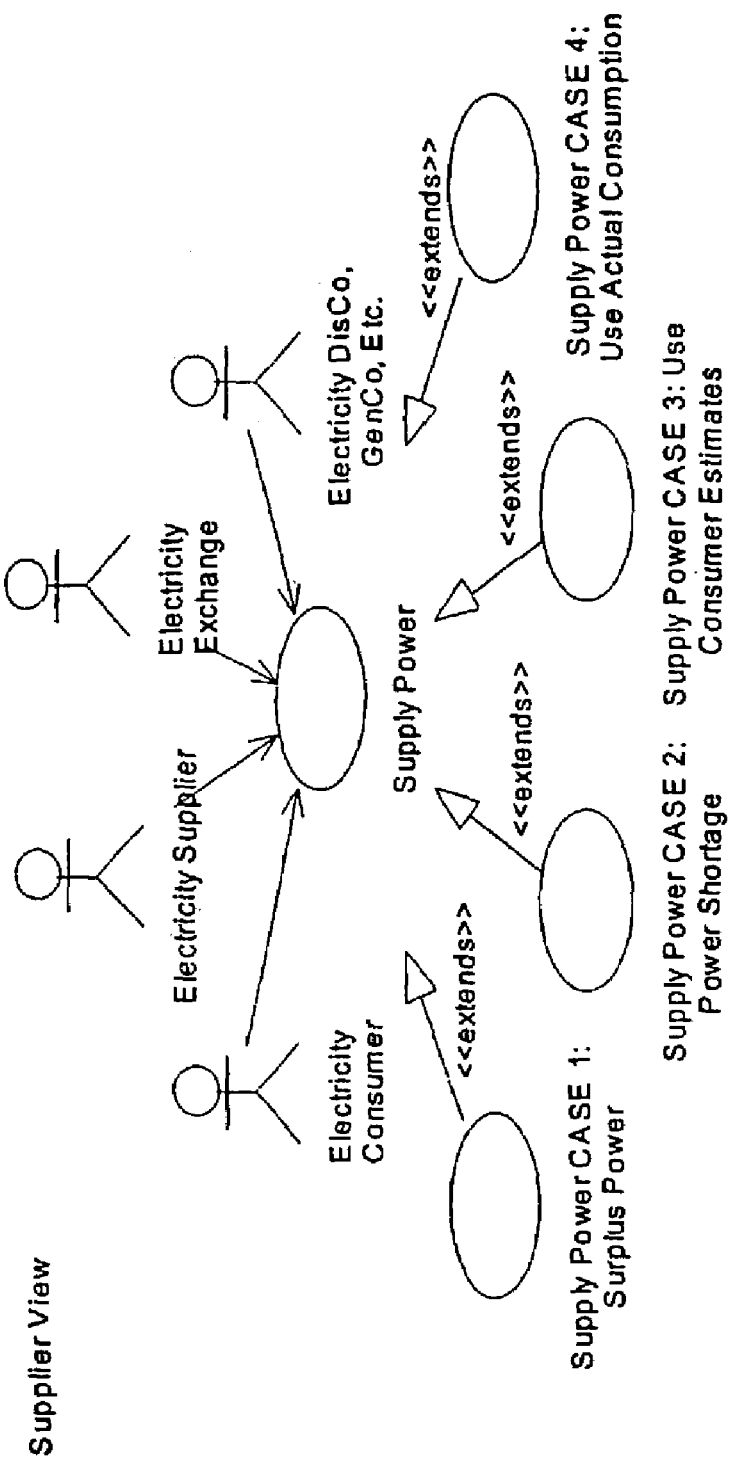
Figure 15:
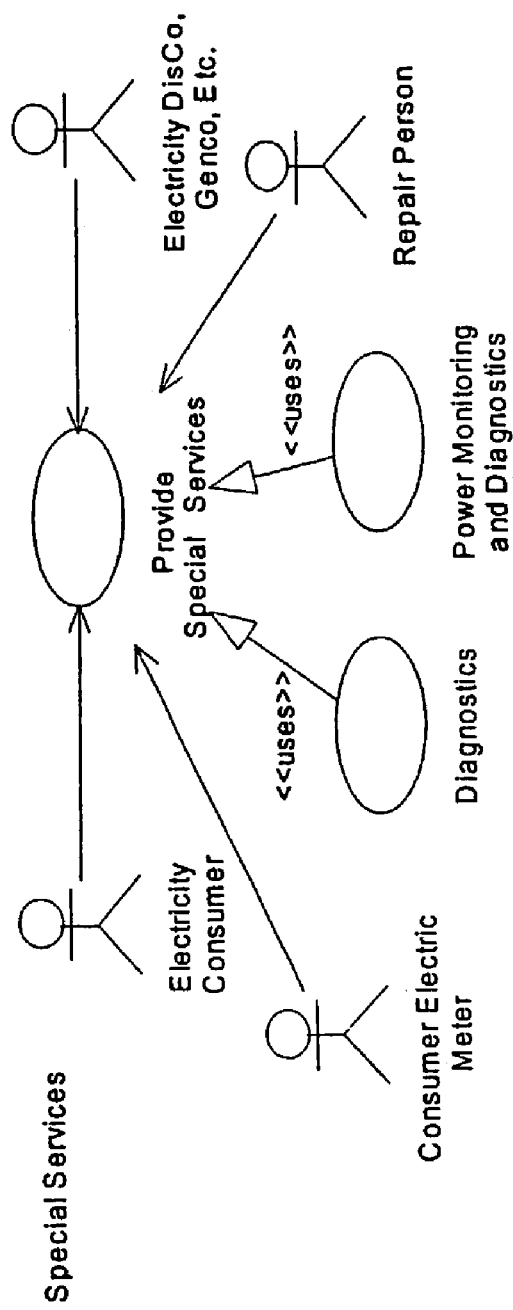
Figure 18:
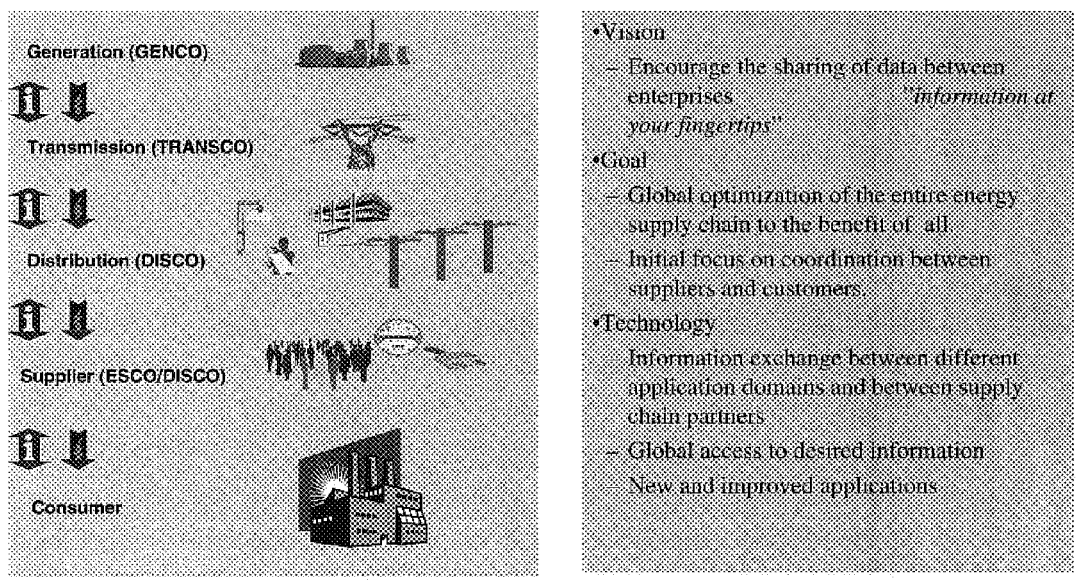
Figure 19:
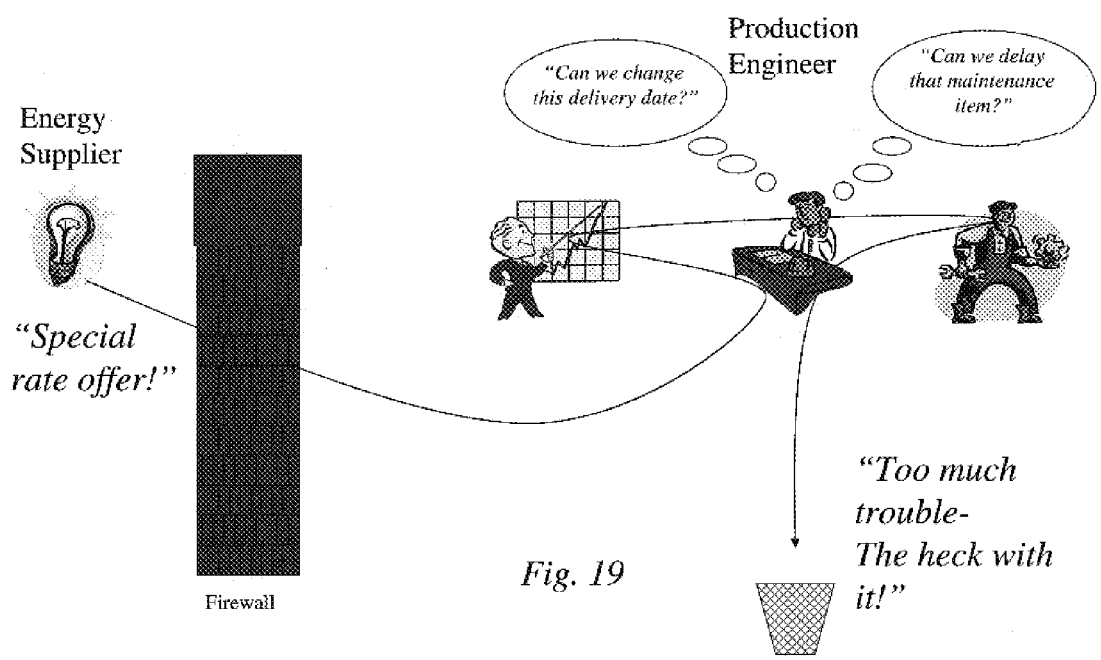
Figure 20:
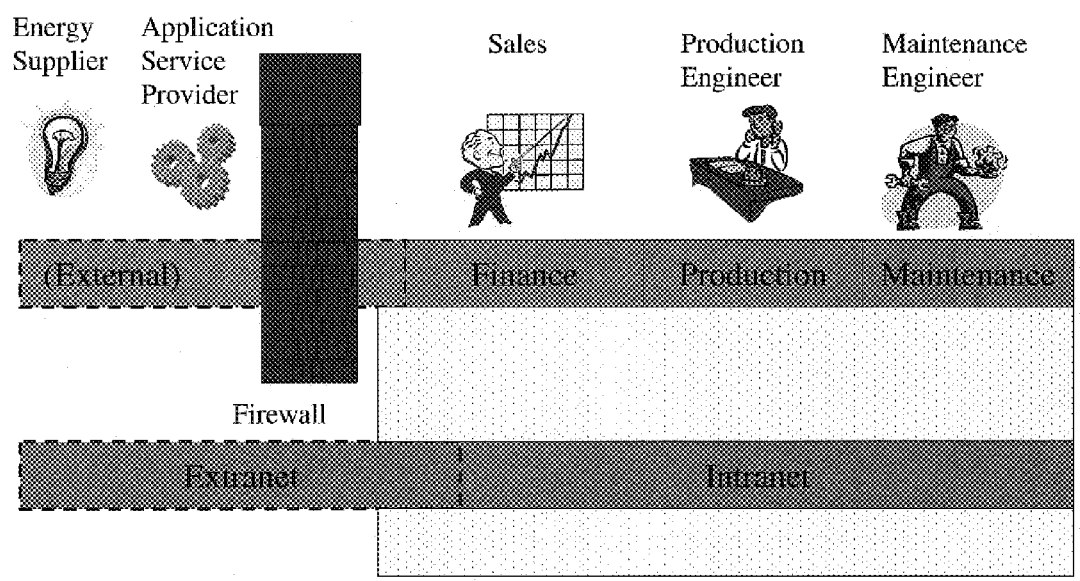
Figure 22:
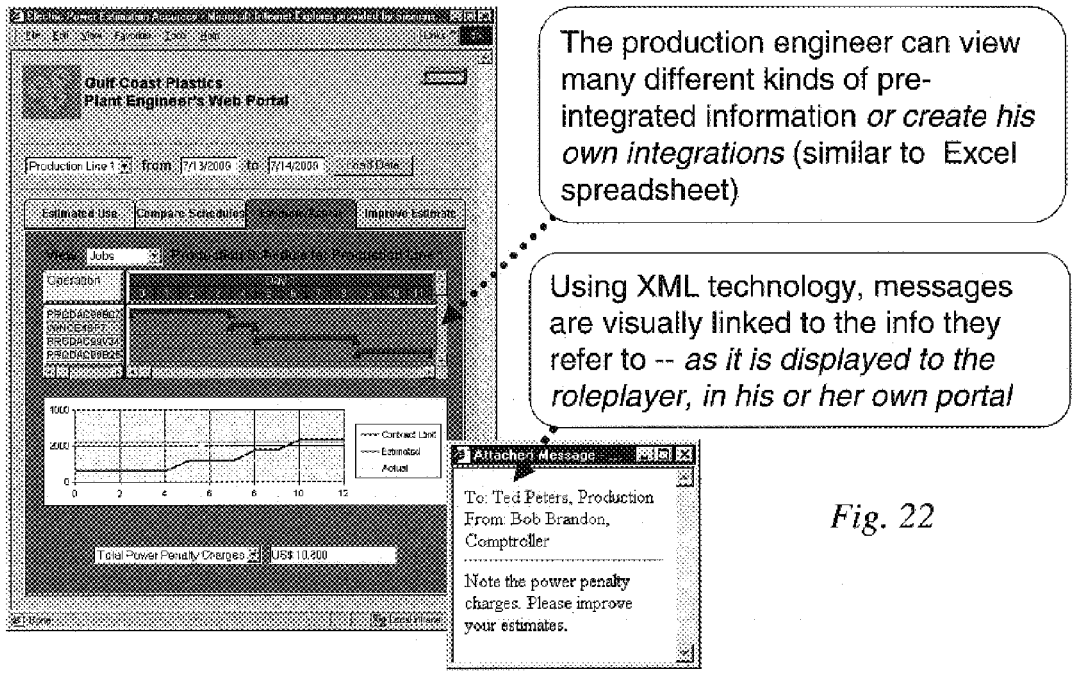
Figure 23:
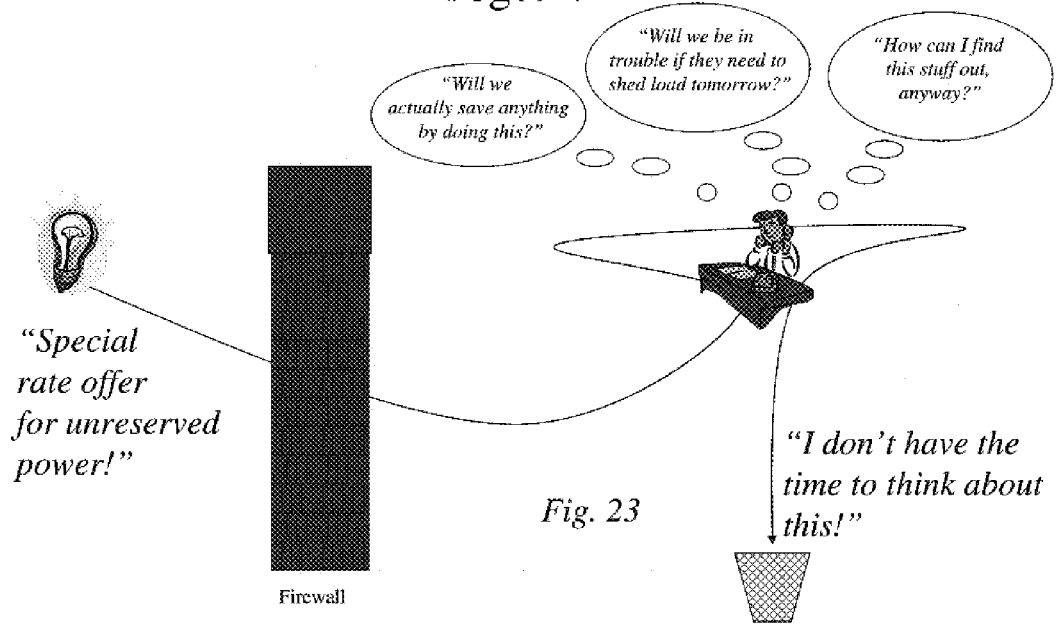
Figure 24:
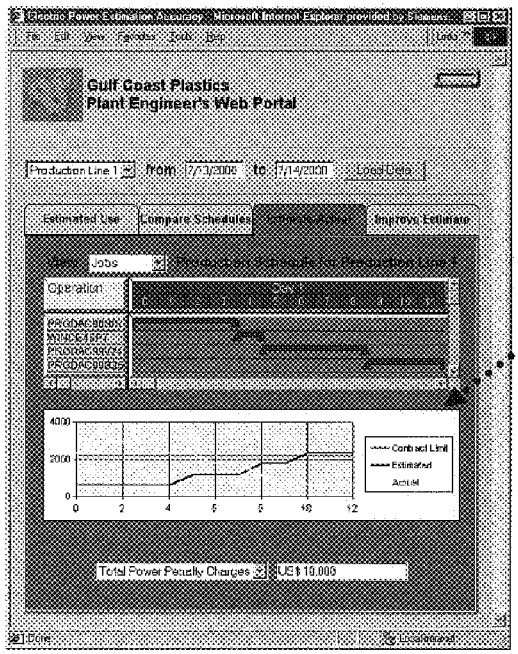
Figure 25:
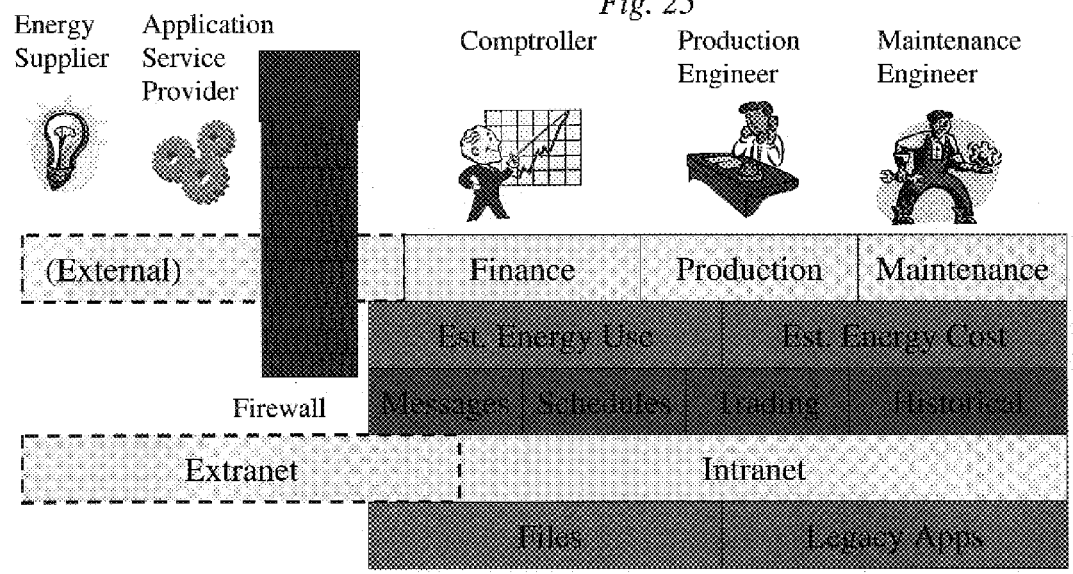
Figure 26:
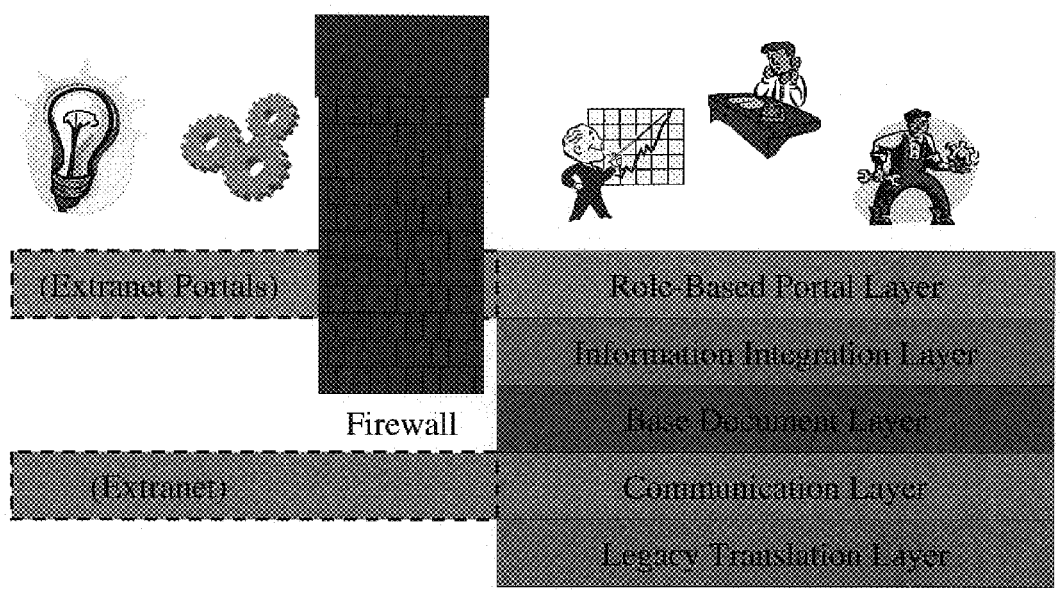
Figure 27:
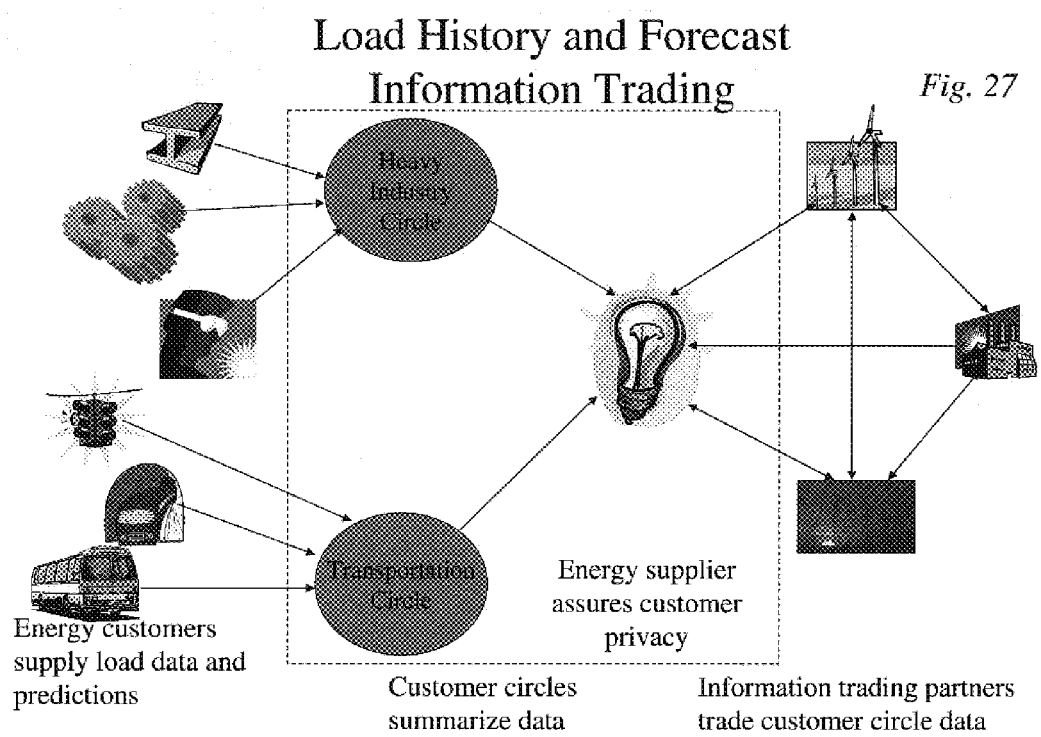
Figure 28:
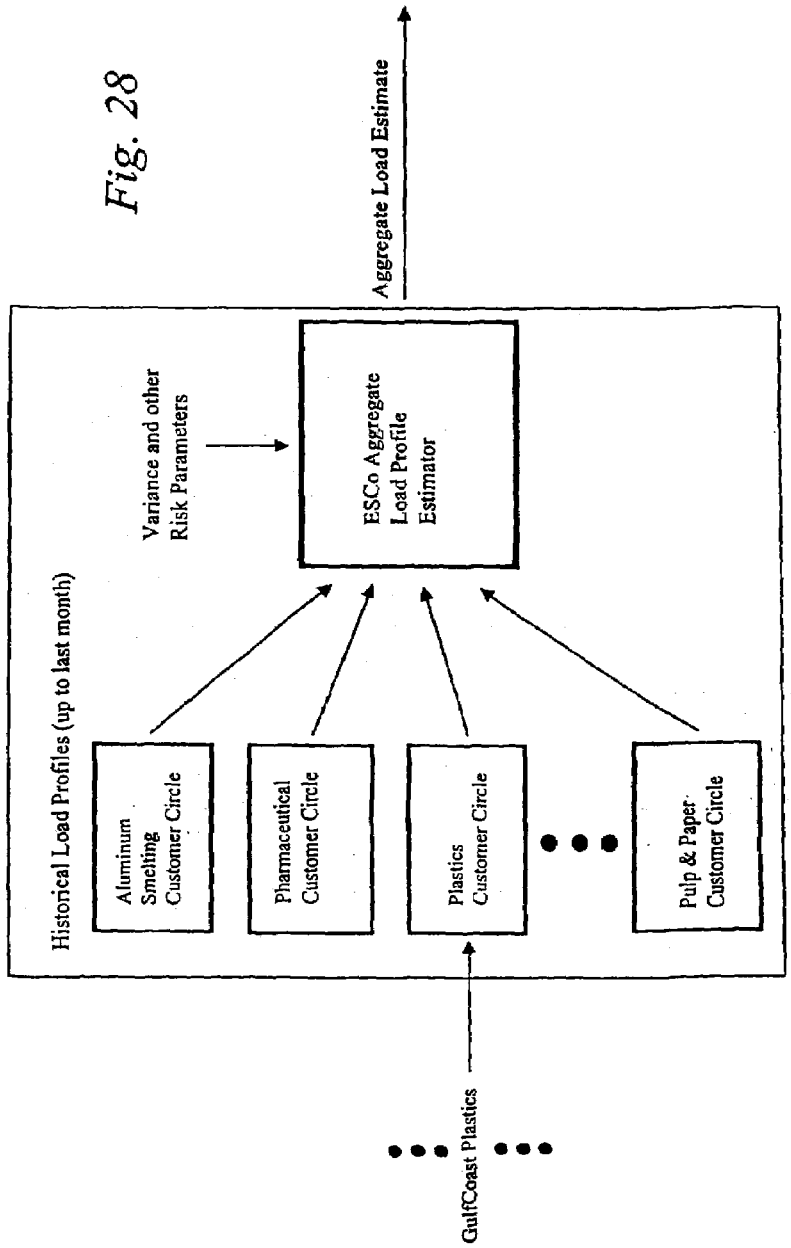
Figure 29:
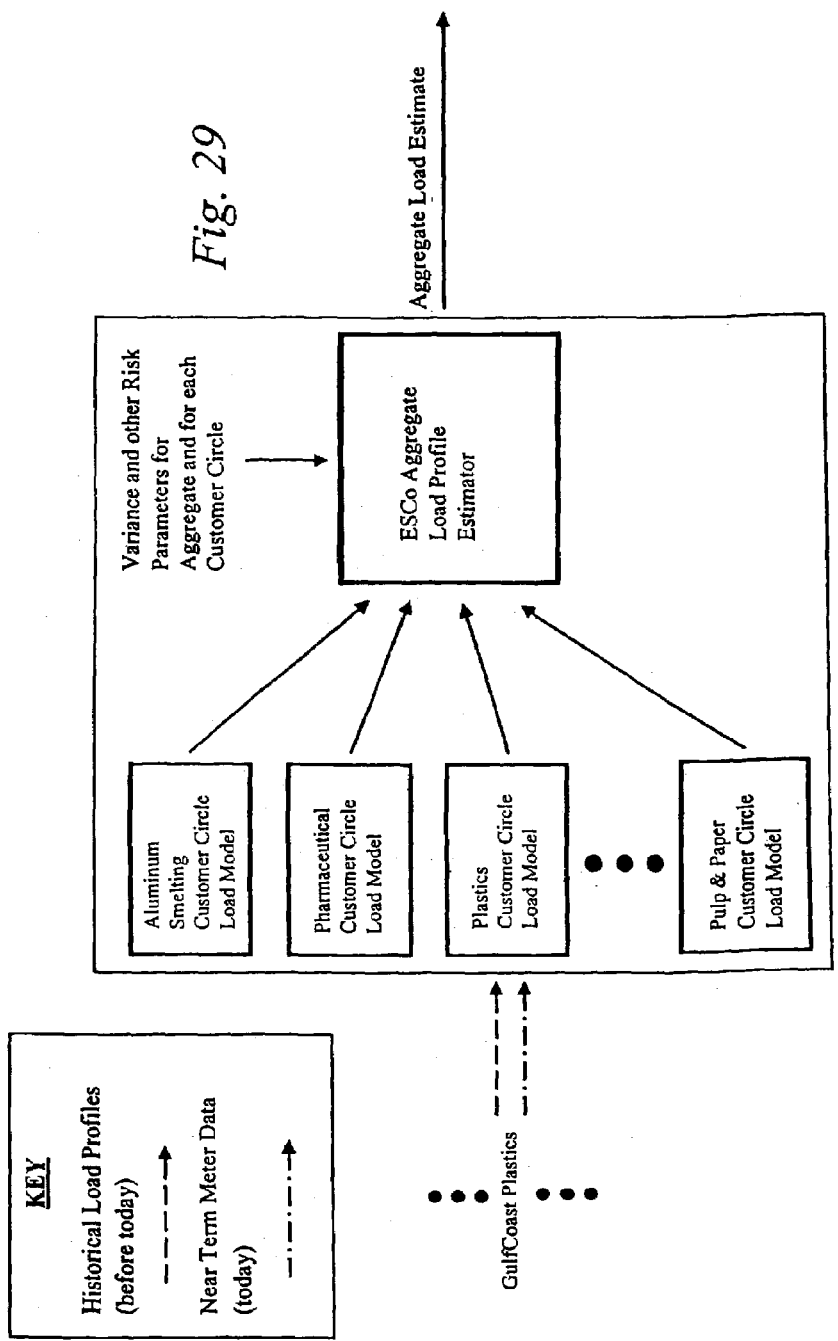
Figure 30:
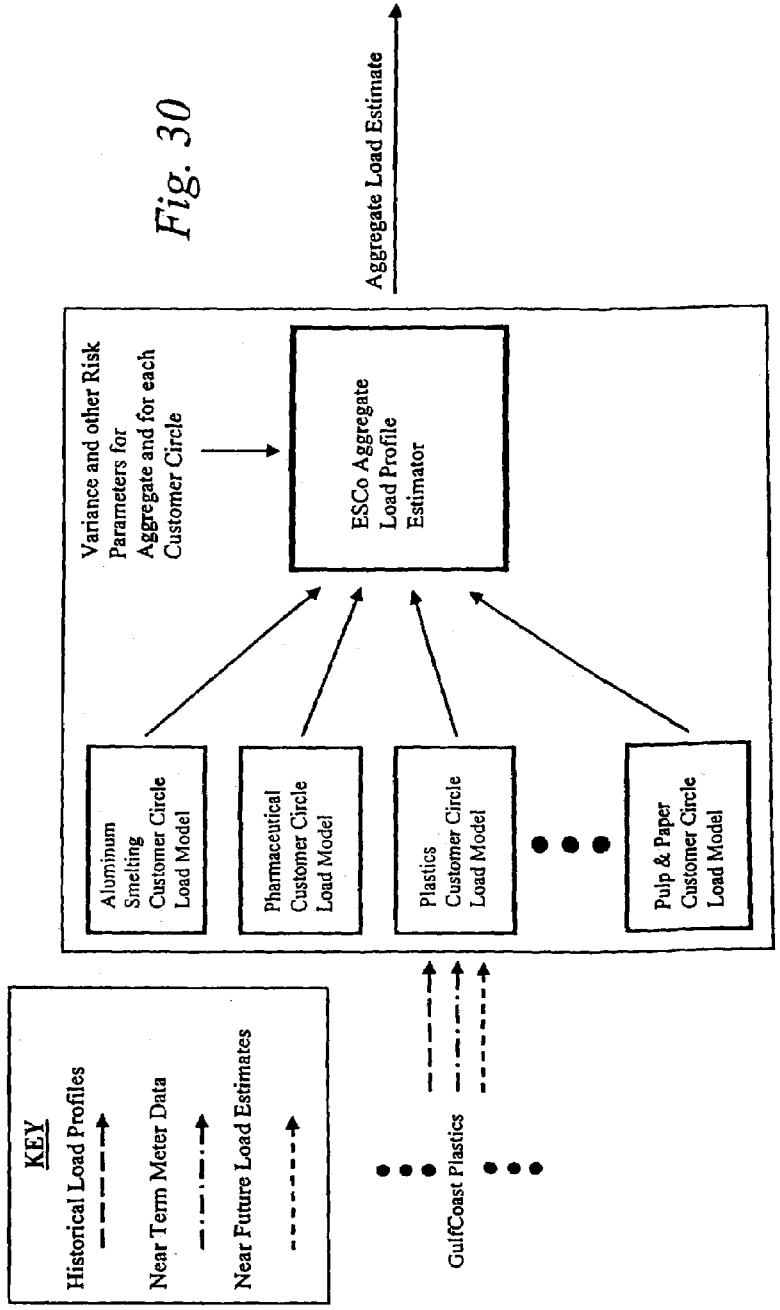
Figure 31:
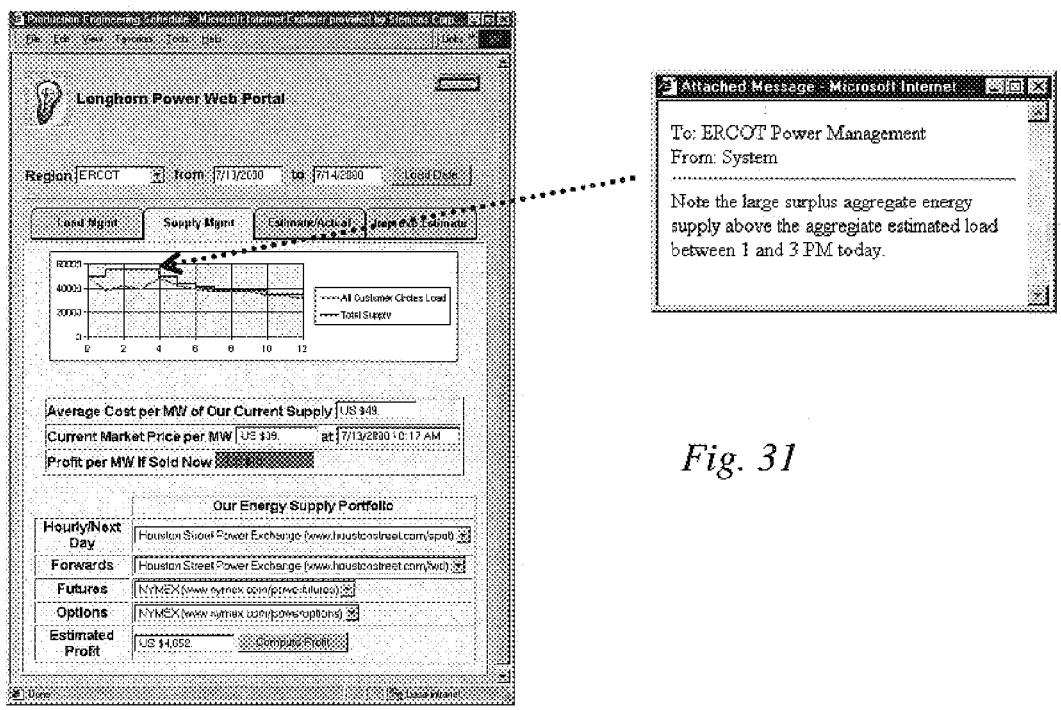
Figure 32:
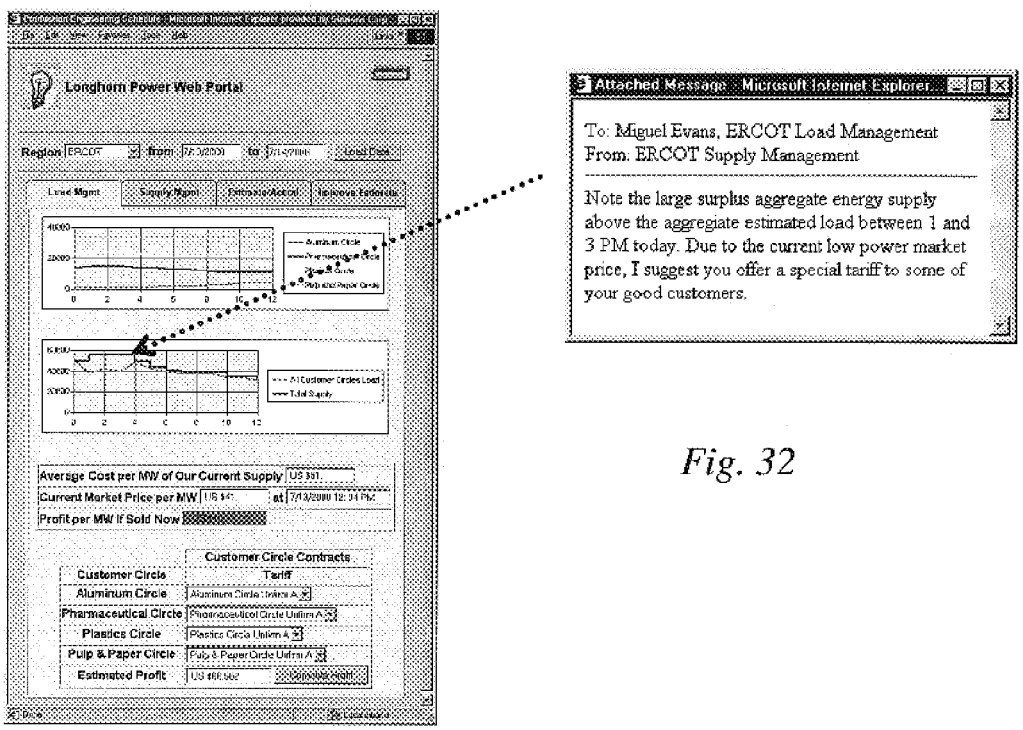
Figure 33:
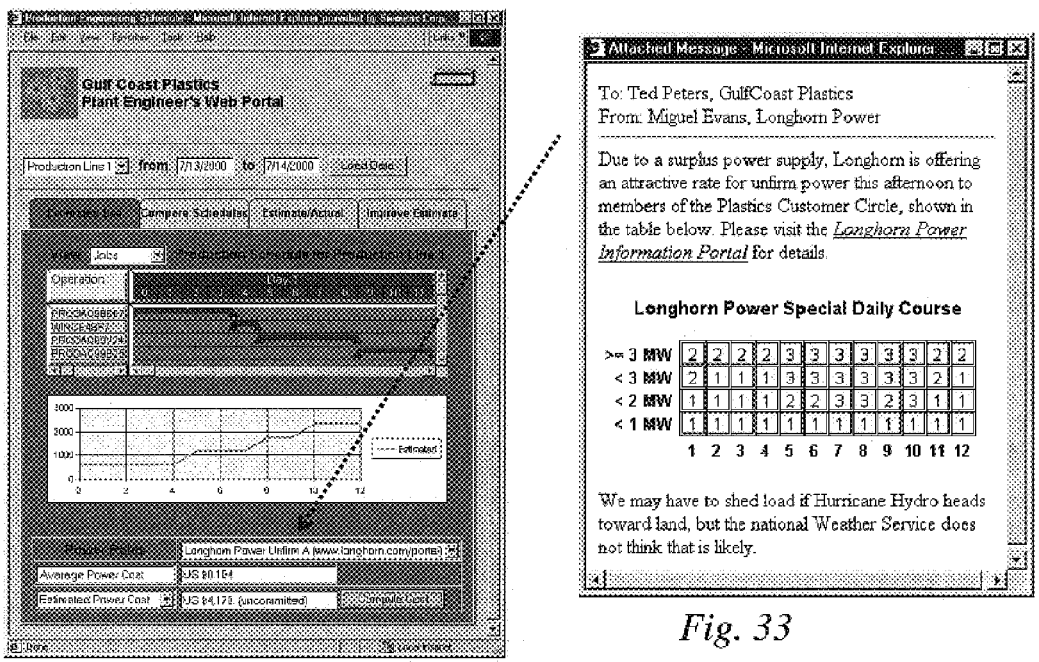
Figure 34:
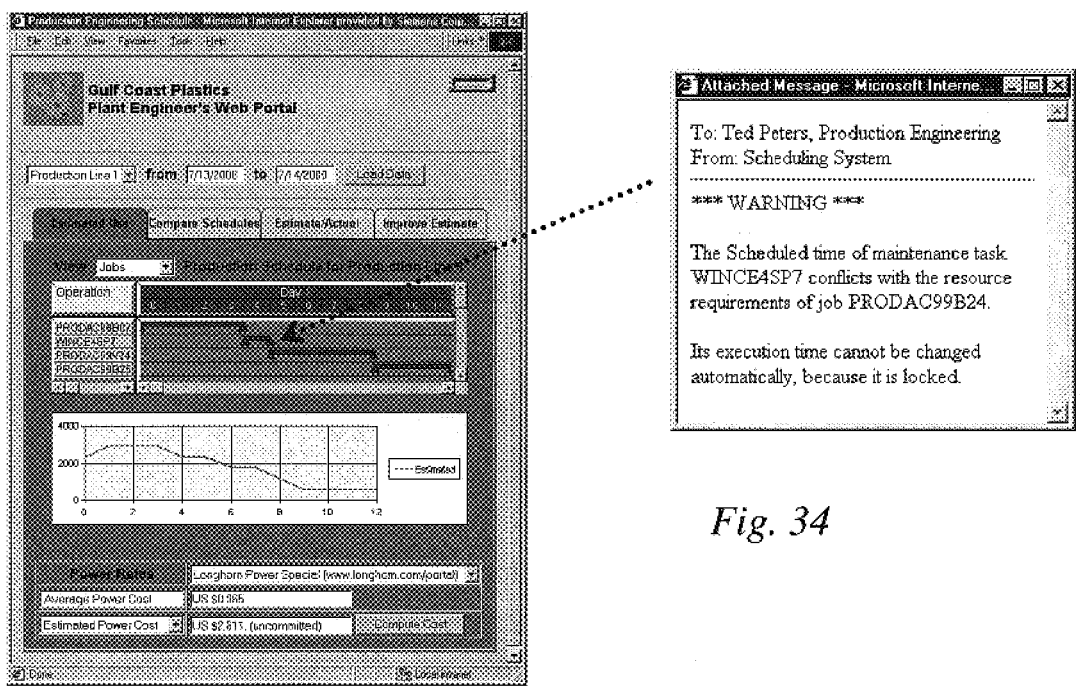
Figure 35:
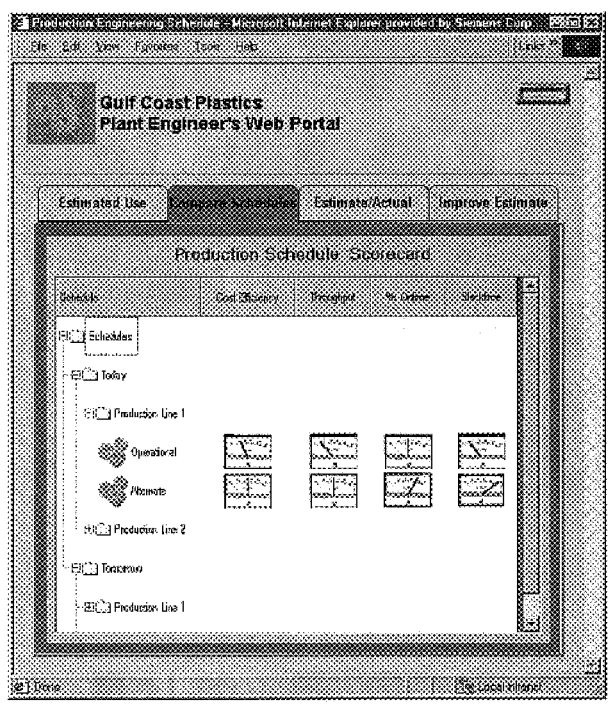
Figure 36:
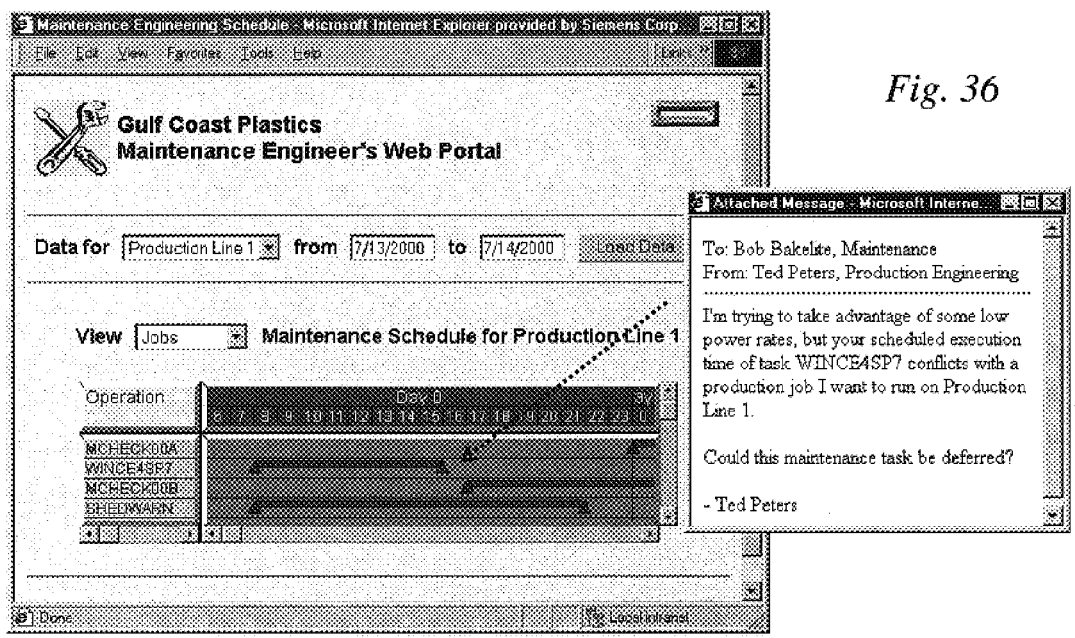
Figure 37:
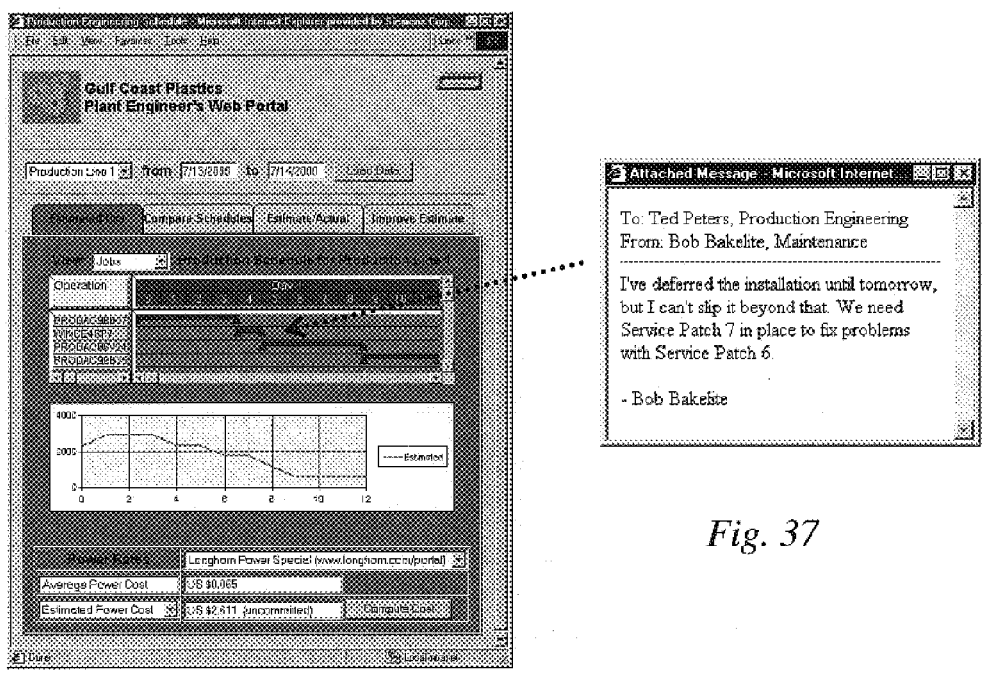
Figure 40:
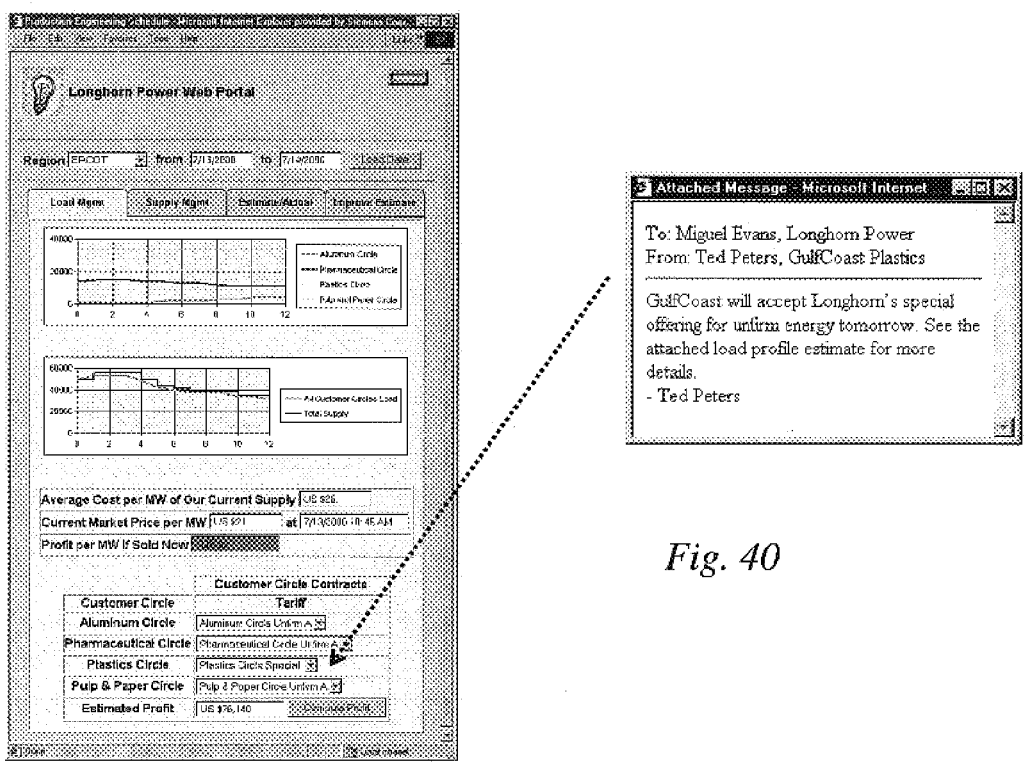
Figure 44:
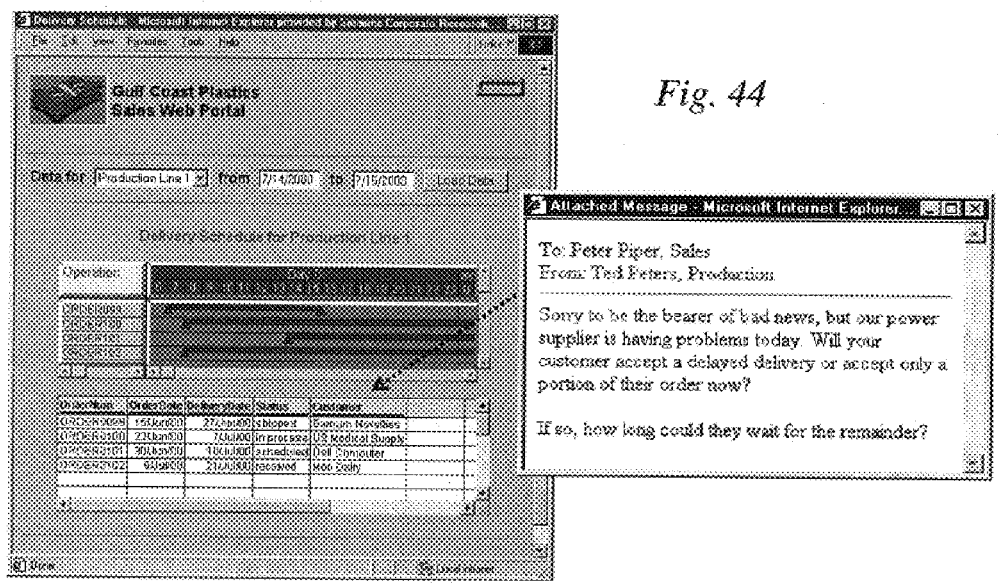
Figure 45:
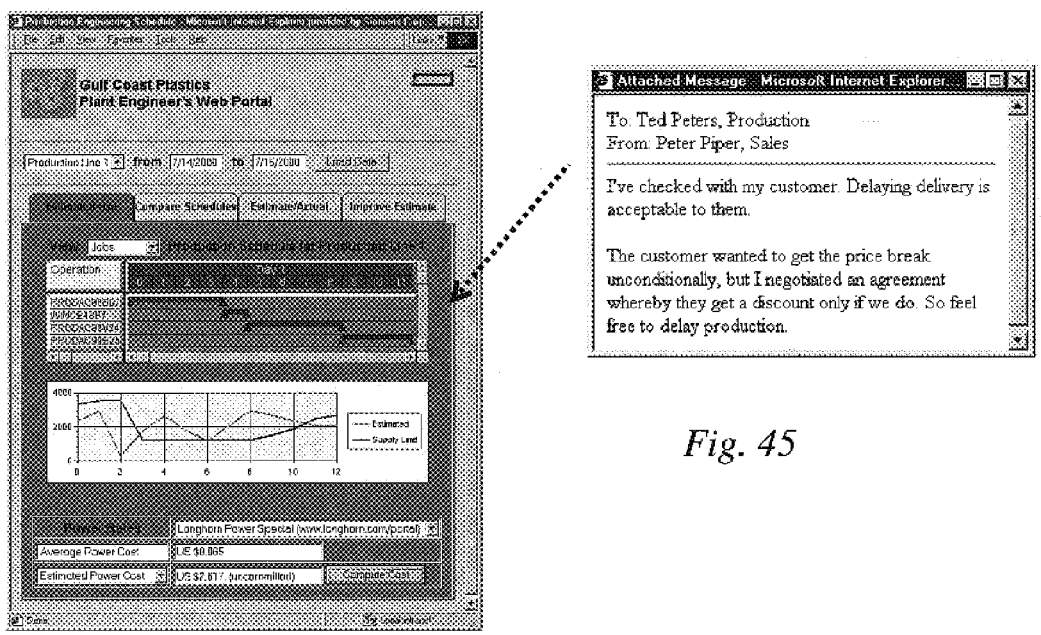
Figure 46:
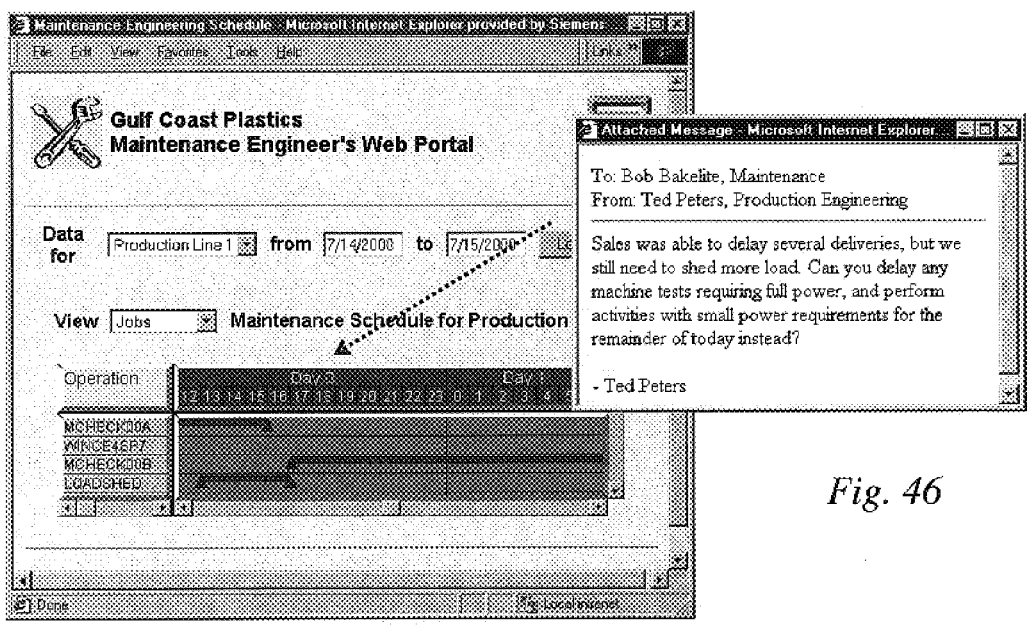
Figure 47:
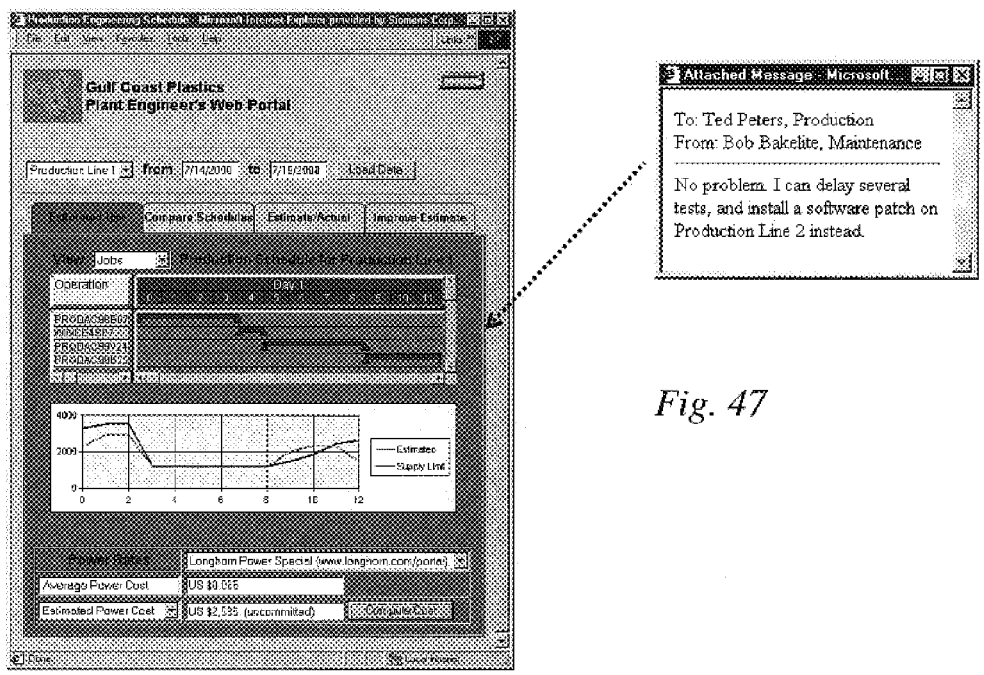
Figure 48:
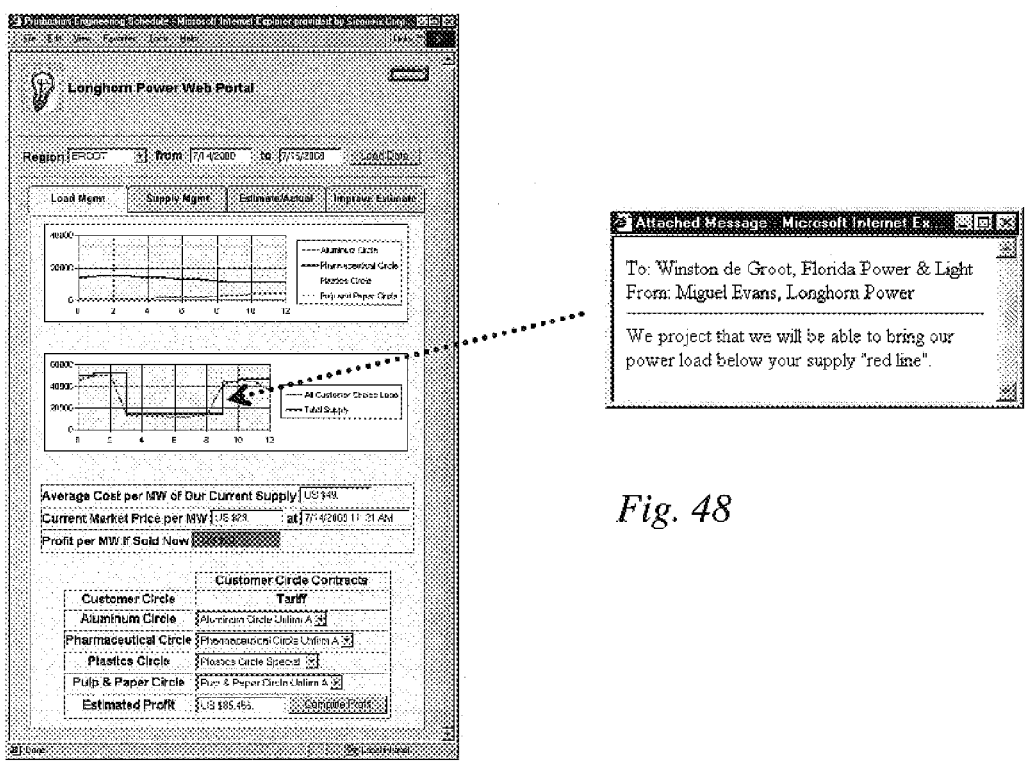
Figure 53:
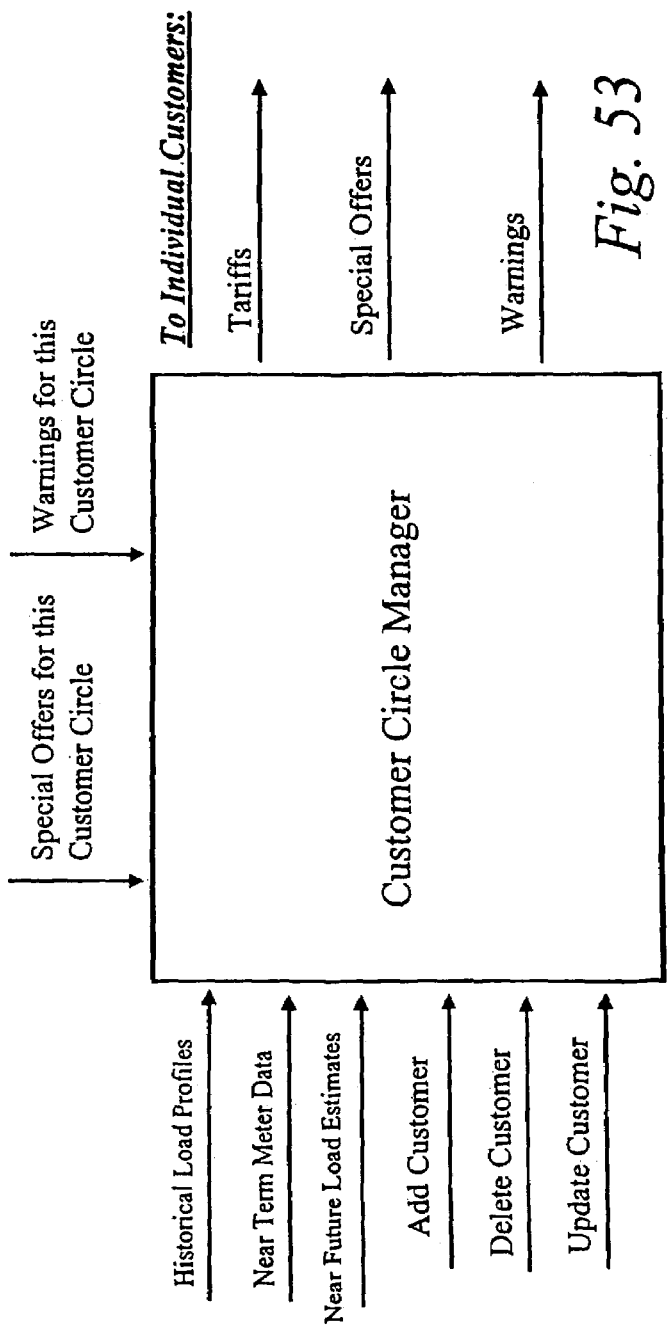

FIGS. 6, 7, 8, 11, 12, 13, 14, 16, 17, 55, 56, 57, and 58 show various message sequence charts for additional cases for power consumers and power suppliers;

FIG. 9 shows an abstract Gantt Chart representation of current Schedule items and a Proposed Revised Schedule;

FIG. 10 shows a supplier view use case diagram, similar to the consumer view shown in FIG. 3;

FIG. 15 shows a use case diagram of the Special Services View, including a number of examples of special services and the major roles participating in providing them;

FIG. 18 shows information sharing across an energy supply chain;

FIG. 19 shows a possible pattern for ad-hoc information flow;

FIG. 20 shows an example of a Role-Based Portal Concept;

FIG. 21 shows, by way of example, a Role-Based Portal;

FIG. 22 shows an example for sharing data and messages;

FIG. 23 indicates additional needs of role-players not being met now;

FIG. 24 shows examples of data sources that could be used to estimate energy use;

FIG. 25 shows some of the data sources, some of the information derived by integrating them, and some of the roles using that information;

FIG. 26 shows an example of a summary view of a layered information integration architecture;

FIG. 27 shows an example of load history and forecast information trading;

FIG. 28 shows an example of Load Estimation based on data from many Customer Circles;

FIG. 29 shows another example of Customer Circle Based Aggregate Load Estimation using both historical and near term meter data;

FIG. 30 shows FIG. 30 shows Customer Circle Based Aggregate Load Estimation using both historical and near term meter data, and near future load profile estimates;

FIG. 31 shows an example of what an ESCo staff member might see on their computer screen to indicate a situation where there is a greater energy supply than needed;

FIG. 32 shows an example of a possible resulting action: offering a special tariff to a particular customer belonging to one of the customer circles;

FIG. 33 shows a production engineer at the energy-consuming customer learning of a special tariff offer from the ESCo;

FIG. 34 shows what a production engineer might see on their computer screen after trying to adjust the production schedule to take advantage of the special energy offer;

FIG. 35 shows what a Production Engineer might see on their computer screen while comparing proposed schedule alternatives;

FIG. 36 shows what a Maintenance Engineer might see on their computer screen when they receive a request to defer a maintenance task;

FIG. 37 shows what a Production Engineer might see on their computer screen when receiving a response from the Maintenance Engineer;

FIG. 38 shows what a Sales Department staff member might see on their computer screen when they receive a request to deliver orders early;

FIG. 39 shows what a Production Engineer might see on their computer screen when receiving a response from the Sales Department staff member;

FIG. 40 shows what a staff member at the ESCo might see on their computer screen when receiving a response from their customer accepting their special tariff offer;

FIG. 41 shows what a Production Engineer might see on their computer screen when receiving a confirmation response from their ESCo;

FIG. 42 shows what a staff member at the ESCo might see on their computer screen when receiving a message from their GenCo indicating the need to shed load FIG. 43 shows what a Production Engineer at the energy-consuming customer might see on their computer screen when receiving notification from their ESCo of the need to shed load;

FIG. 44 shows what a Sales Department staff member might see on their computer screen when they receive a request to delay order delivery;

FIG. 45 shows what the Production Engineer might see on their computer screen when receiving a response from the Sales Department staff member;

FIG. 46 shows what a Maintenance Engineer might see on their computer screen when they receive a request to reschedule a maintenance task;

FIG. 47 shows what the Production Engineer might see on their computer screen when receiving a response from the Maintenance Engineer;

FIG. 48 shows what a staff member at the ESCo might see on their computer screen when preparing to send a response to their GenCo to tell them that they will be able to comply with the load shed request;

FIG. 49 shows an example of an expense that could easily be tracked by energy consumers using information integration techniques;

FIG. 50 shows an example of what a staff member might see on their computer screen while using variance information to determine a better estimate of the level of uncertainty in their load estimate; this information would be used to decide how much to adjust the maximum amount of power allowed by contract with their ESCo—resulting in reduced energy costs for that energy consumer;

FIG. 51 shows an example of an expense that could easily be tracked by ESCos using information integration techniques. In this example underestimation has incurred frequent penalties;

FIG. 52 shows an example of what an ESCo staff member might see on their computer screen indicating recomputed error bounds that would reduce risk;

FIG. 53 shows a high level view of the inputs to and outputs from the Customer Circle Manager Software.

Figure 54:
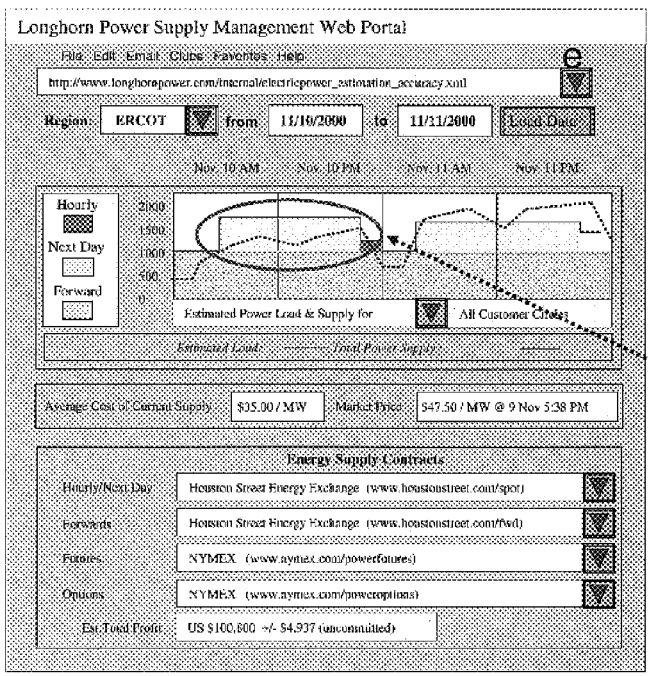
Figure 55:
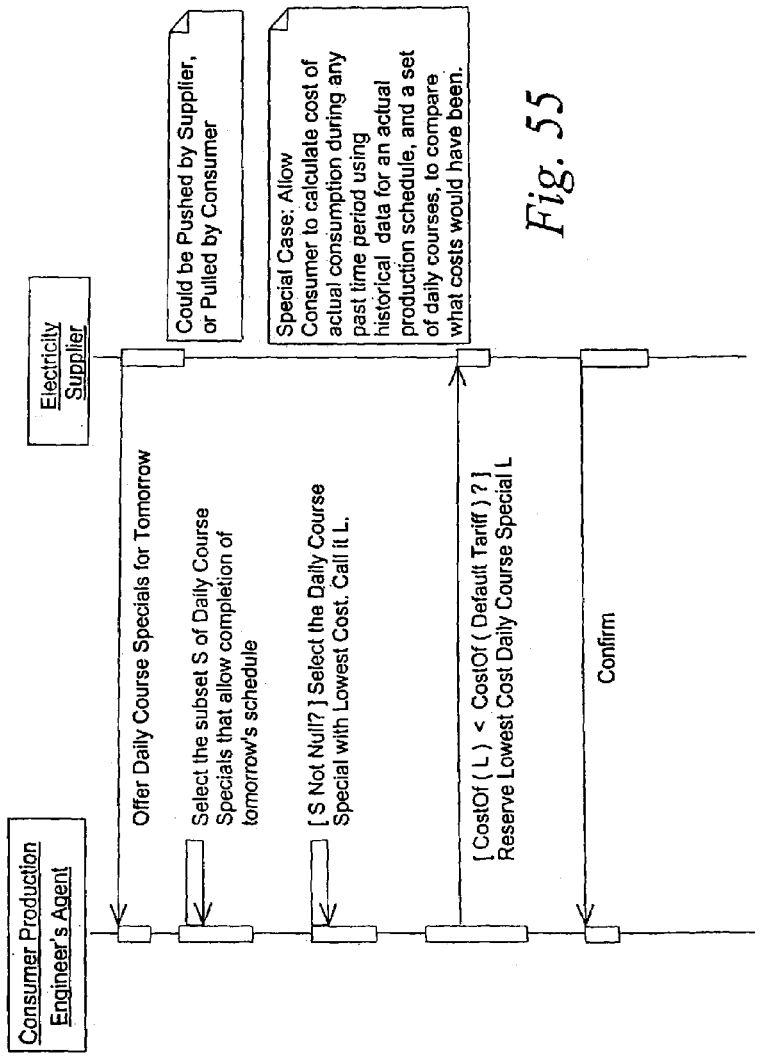
Figure 56:
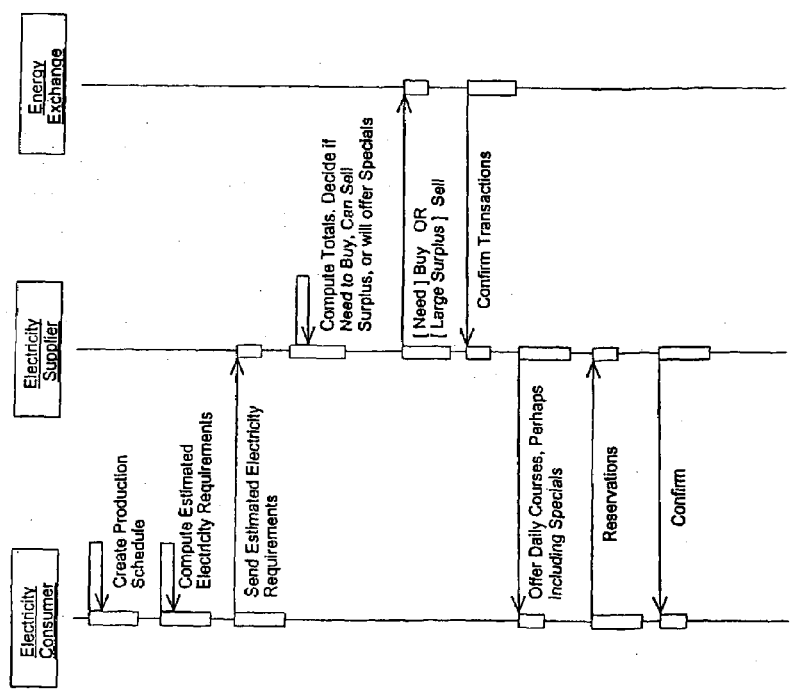
Figure 57:
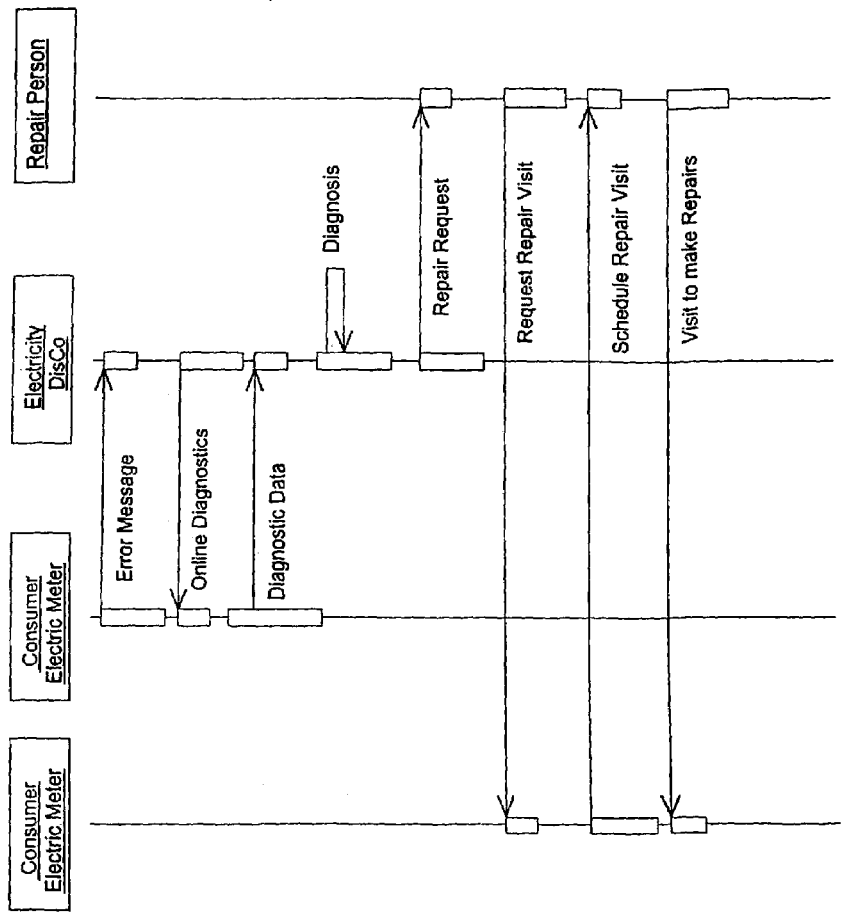
Figure 58:
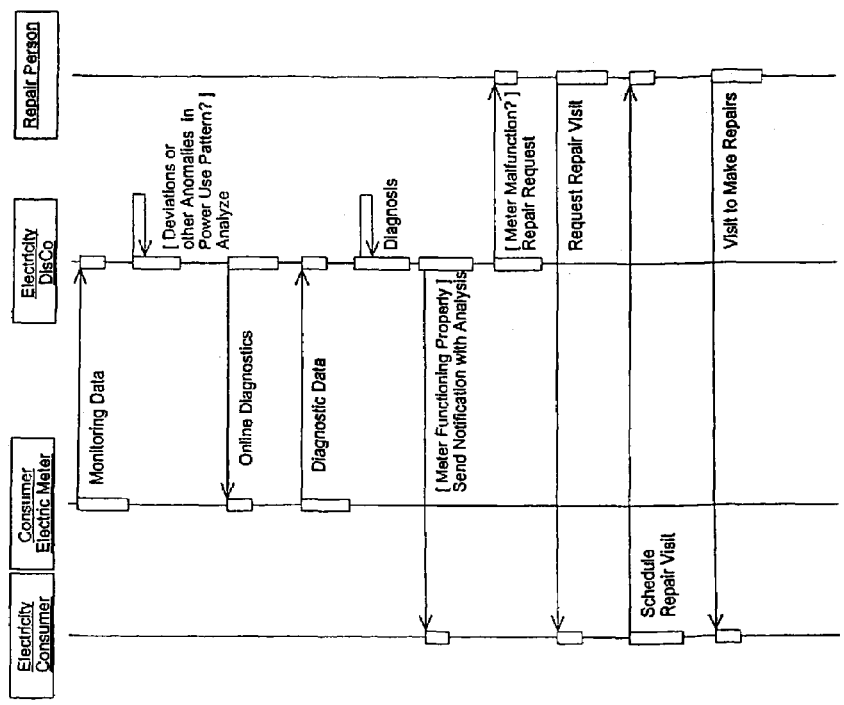

FIG. 54 shows what an ESCo Supply Management staff member might see on their computer screen indicating automated advice about projected energy surpluses and shortages during near-term time periods;

FIG. 55 shows a Message Sequence Chart (MSC) for an Automated Energy Trading Scenario;

FIG. 56 shows a Message Sequence Chart for Customer Load Estimation by Energy Suppliers to reduce risk;

FIG. 57 shows a Message Sequence Chart showing an online diagnostic services scenario; and FIG. 58 is a Message Sequence Chart showing monitoring for anomalies, with anomaly diagnosis and customer notification.

For an enterprise-level energy customer to take advantage of short-term pricing, it is herein recognized that it must be able to reliably predict and control its total short-term energy demand while staying productive. Furthermore, this must be done economically, without dedicating too much money or manpower. Under current technology, this task is too uncertain, complex, and labor-intensive to be practical.

On the energy supplier side, Discos (energy Distribution Companies) and ESCOs (Energy Service Companies) are currently assuming huge risks by buying energy in an open market but selling into inelastic demand. This is believed to have resulted in the $7000/mWh prices in the Midwest during June 1998 (whereas $30/mWh is "normal"), as stated above, which bankrupted several companies. This risk has probably slowed down adoption of electric utility deregulation in the United States. The risk to suppliers is a great barrier to the success of deregulation. Discos and ESCOs are already looking for ways to control demand through customer contracts. Supply restrictions from Discos/ESCOs have been tried, but they are not commercially appealing to most enterprises, because they remove some of the enterprise's control over its own operations and place it in the hands of the energy supplier.

It is herein recognized that a key to making the deregulated energy market work smoothly is to solve both problems, in a way that is appealing to both energy customers and suppliers.

In considering objects of the present invention in providing solutions to such problems, it is noted that since a shortfall in the amount of electric power generation and transmission capacity is predicted to exist for the foreseeable future, it is herein recognized that an important option available to keep demand from causing electric power costs to become unstable is to manage that demand more efficiently. Energy load management at the electricity consumer level is expected to become an important solution method. There appear to be few alternative approaches, one of which is to install electric power generation plants near consumers. It is herein recognized that a combination of these two approaches is also possible.

TransCos and DisCos generally remain regulated entities even under electric power deregulation. GenCos, ESCos, and other electric power resellers are the deregulated entities that would benefit from risk reduction practices. They could reduce their risk through more frequent availability of actual electric power use data in the form of meter readings, and more accurate forecasts of future electric power use.

Another object of the present invention is to enable and support close coordination between energy suppliers and customers through information sharing and integration:

Enable energy customers to easily optimize their total operating costs, including rapidly fluctuating costs of energy.

Improve the ability of energy suppliers and customers to optimize their operations in the presence of fluctuating price and supply of energy.

Allow energy costs to be optimized across the entire energy supply chain.

It is herein recognized that a better economic model for the entire system is one in which the energy demand of enterprises is elastic. If an enterprise has elastic demand, it can take advantage of rapidly changing energy prices by flexibly adjusting its energy consumption. A business that can do this can run more profitably than one with inelastic demand, all other things being equal. If enterprise-level elastic demand becomes common in a deregulated market, most enterprises will eventually need to have it, in order to stay competitive.

An object of the present invention is generally to provide solutions to enterprises that make use of innovative integration of information. Another object is to provide information when it is needed, where it is needed, and in the format in which it will be most useful to guide important decision making. The present inventors have coined the term "Information at Your Fingertips" for this approach.

In accordance with an aspect of the invention with regard to the domain of electric power, it is proposed to integrate actual electric meter usage data with production schedules. This information can be used both by electric power consumers to forecast future electric power needs more accurately and by energy providers to more accurately forecast their power needs to fulfill existing contractual obligations. This information is a valuable input to decision making which can reduce costs, increase profits, and reduce risk.

To simplify the scheduling process, production scheduling in the past assumed that each machine and person had infinite capacity. The constraint limiting what was possible to be produced was considered to be the quantity of parts and materials available. This approach fit well with the material requirements planning (MRP) tools used at that time by long range corporate planners. Schedulers, in effect, tried to develop the best schedule fitting the available material budget.

At the present time, a more sophisticated scheduler generally no longer assumes infinite resource capacity. These finite capacity schedulers use available resource capacity in addition to available materials to constrain production capacity. The resulting schedules must satisfy the resource capacity budget.

In the era of electricity de-regulation, an additional energy budget constraint may in the future become desirable in schedulers used in energy-intensive industries. This is an additional constraint that production schedules must meet because it can result in cost savings. It is herein recognized that an energy budget can be enforced by a power management system.

Given a load profile and a production profile, it is herein recognized that one can find the answers to a number of important questions that plant production managers are apt to want to ask, such as:

Given an order queue Q for a future time period, how much electric energy will be required?

Given Q and a guaranteed amount of electricity to be supplied, that is, a firm reservation, is any schedule S feasible?

Given Q and a firm reservation for a given amount of electric energy, optimize S to maximize the absolute profit of executing Q. (In a flow process, maximize the average absolute profit.)

Given S and an unfirm reservation for electric energy, with a possible range of electricity to be supplied between MIN and MAX, produce a set of schedules S', each of which most efficiently uses a specific quantity of electric energy (between MIN and MAX in evenly-spaced steps.)

Given a set of equipment M that is scheduled for maintenance during a future time period, can we safely defer maintenance of some subset m in the event that our energy supplier has offered a special price reduction in the cost of electricity for that future time period? This computation should weigh the cost of the risk involved against the projected electricity cost savings. If we cannot safely do so, it may be possible to move maintenance to an earlier time period.

Note that, for scheduling purposes, a maintenance task on M can be considered to be simply an internally-generated order (or set of orders) which is constrained to use the equipment of M as a resource. Such an order can be placed in Q and scheduled. Given advance warning of a power reduction, determine a set of equipment M upon which maintenance should be performed, such that cost impact is minimized?

Aspects of the present invention can be explained by way of illustrative examples or scenarios. Thus, real-world events in the energy supply chain can be modeled through the use of several fictitious organizations: a fictitious high-volume energy consumer in the business of plastics, hereinafter called XYZ Company and a fictitious power supplier hereinafter called ABC Power. No name similarity or other similarity is intended to any existing entities. A further set of fictitious illustrative scenarios covering various situations and approaches to problem solution and optimization of resources presented below, these being helpful to gaining a more thorough understanding of various aspects of the invention.

We next consider a consumer's perspective.

1. In the present illustrative example, the fictitious XYZ Company is a high-volume electric power customer in Texas. By way of further example, it uses a fictitiously named entity ABC Power as a power supplier.

2. In the present illustrative example, XYZ Customer belongs to ABC Power's customer circle of, for example, Texas plastic product manufacturers. Members of this customer circle receive special rates and services in return for providing reliable data about their projected demand for the next few days. An example of customer circles is provided by Amazon.com.

3. In the present illustrative example, overnight, XYZ Company and ABC Power have automatically negotiated several daily courses for the next few days. They have exchanged several RFP and proposal documents in XML.

In the present illustrative example, the negotiation process uses the Energy Trading Advisor. The two sides have different, but compatible, goals in this negotiation. The goal of XYZ Company is to minimize the cost of fulfilling their outstanding contracts for the next few days. ABC Power has the goal of maximizing the profit of its power sales, without exceeding its available electricity supply.

4. In the present illustrative example, Chief Engineer, the chief engineer of XYZ Company uses, as he does every morning, a Web browser to log into the customer portal site of ABC Power. He downloads the daily courses that ABC Power is offering for tomorrow.

5. Historical electricity use by each machine, plus machine capacities, inventory information, and a list of pending orders are used to generate a set of the lowest cost schedules for one or more of the daily courses. For the purposes of the present example, it is herein assumed that each machine that consumes a significant amount of electricity is metered separately or, for example, that its energy consumption can be estimated statistically. In the present illustrative example, any schedule can be displayed in a Web Browser along with graphs of its projected electricity usage, cost, and any limits on peak power use. After consulting with the production managers about these alternative production schedules, Chief Engineer of XYZ Company selects the proposed production schedule that he thinks will be best.

Rather than allowing the daily course negotiation to be concluded automatically, chief engineer of XYZ Company wisely insists on having the final judgment. In the present illustrative example, this morning he selects the lowest-cost schedule, even though it uses a daily course involving an unfirm power reservation. In doing this, he may impact the completion of urgent orders for important customers. However, he judges the chance of substantial load shedding to be small, and hence may comfortably accept an unfirm reservation. In fact, the cost of power is so low, that the chief engineer of XYZ Company attempts to find scheduled maintenance operations that could safely be deferred until some later date in the near future. By doing so, he could increase the available capacity for production using the very low cost power being offered by ABC Power for the following day. After communicating his desires electronically to the Maintenance Supervisor at XYZ Company, they agree upon a number of maintenance operations that can safely be deferred, thus providing extra production capacity.

Before agreeing to this desirable daily course, the chief engineer of XYZ Company checks with his sales department in the present illustrative example, to see if he can profit from this extra production capacity. He discovers, for example, that one of XYZ Company's good customers would be very happy to take delivery of an order a day early at lower cost. XYZ Customer would be willing to pass part of its savings on to this good customer.

Still using his Web browser, Chief Engineer of XYZ Company makes a reservation with ABC Power for the daily course he has chosen, and also supplies a projected electricity load profile to them.

ABC Power accepts the negotiated daily course chosen by Chief Engineer of XYZ Company.

Figure 1:
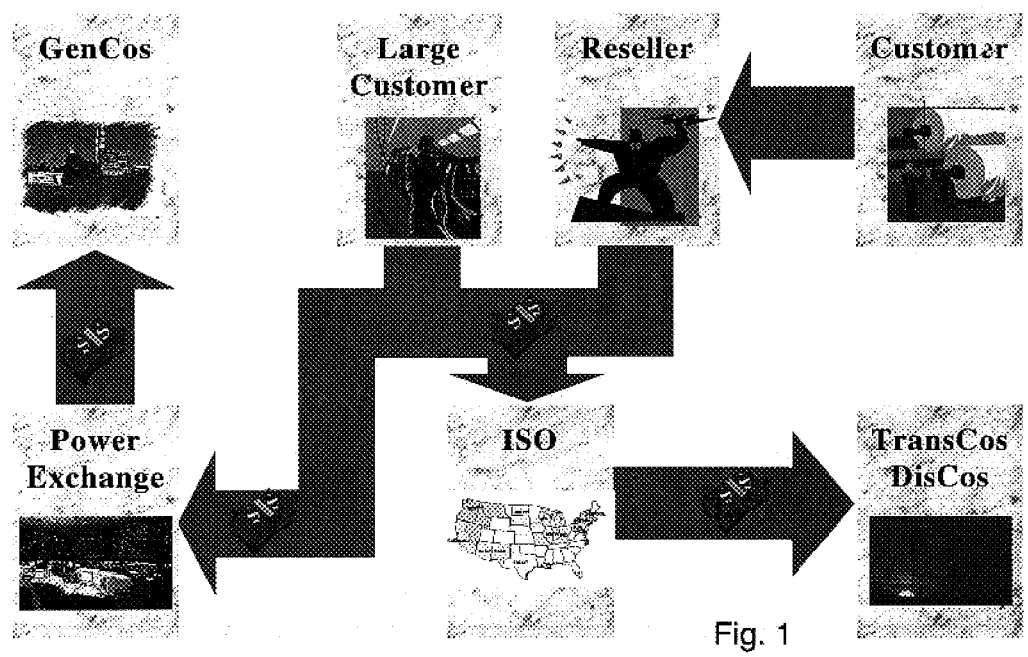
FIG. 1 shows an example of money flow in a deregulated market.
Figure 2:
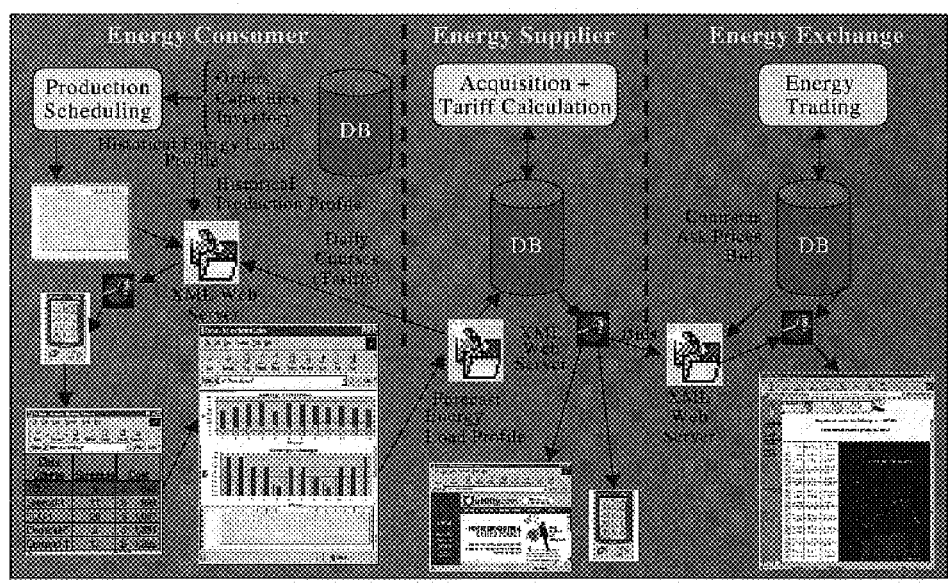
FIG. 2 shows flow as will be described in detail in the specification.

The data flow in items 4 and 5 above are depicted in FIG. 2

1. In accordance with an exemplary embodiment of the invention, ABC Power aggregates projected electricity load profiles received from its customers to help determine its likely electric power needs. This information is used to reduce risk, reduce waste and hence lower costs, and increase profits. Based on current contracts, decisions are made about bidding on additional power, offering excess power on energy exchanges, load shedding, or offering specials to favored consumers.

Increasing the frequency of sampling and communication of electric power meter data affords a more detailed and timely knowledge of current power usage, which confers a competitive advantage. Watching trends developing can improve decision making and reduce risks. If significant changes to projected power load profiles resulting from production schedule changes could also be promptly communicated to power suppliers such as ABC Power in this exemplary embodiment of the present invention, that would confer an even greater competitive advantage, thereby reducing risk even more.

2. ABC Power, in this exemplary embodiment of the present invention, sells not only electricity, but also information. In accordance with an exemplary embodiment of the invention, fifteen minutes later (on the quarter-hour mark), for example, ABC Power supplies revised consumption schedule estimates as XML documents to its information customers. These estimates include aggregate data for all customers in ABC Power's plastics-manufacturing customer circle, but do not identify XYZ Customer specifically. Furthermore, if it is so desired, ABC Power can supply information aggregated over all ABC Power's customers to power producers.

ABC Power's information customers in this exemplary embodiment of the present invention, are organizations that need reliable estimates of near-term regional power consumption. These include, for example, DisCos, as well as power providers such as GenCos and IPPs (Independent Power Producers).

3. One of ABC Power's information customers in this exemplary embodiment of the present invention, is Cajun Power in Louisiana. They use ABC Power's customer circle data to refine their own estimates of expected demand in the next few days. Using this information, they could plan how much generation capacity to place online and how much to keep in reserve.

4. Analysis of electricity load profiles can identify long term patterns that can be the basis for creation of new energy products designed even for small select groups of industrial consumers. This can result in new customer circles that ABC Power chooses to create and serve.

In accordance with an exemplary embodiment of the invention, FIG. 3 shows an overview UML Use Case diagram showing the participants involved in picking a daily course, and indicating that there are several alternative case choices for picking a daily course.

The actors' views in the scenario of FIG. 3 include Consumer Sales Person, Consumer Enterprise Integrated Info Server, Consumer Production Engineer, Consumer Maintenance Engineer, and Electricity Supplier. The courses include Course CASE 1: No schedule changes, Course CASE 2: Low Rates/Change Schedule, and Course CASE 3: Load Shedding.

The consumer enterprise integrated information server is a repository of various enterprise information accessible via web browsers. Also accessible on this server are an integrated collection of software objects for analyzing enterprise information in order to improve the decision making capabilities of employees throughout the enterprise. Although this server is not a person, it is still an actor because it interacts with humans and other entities.

Figure 4:
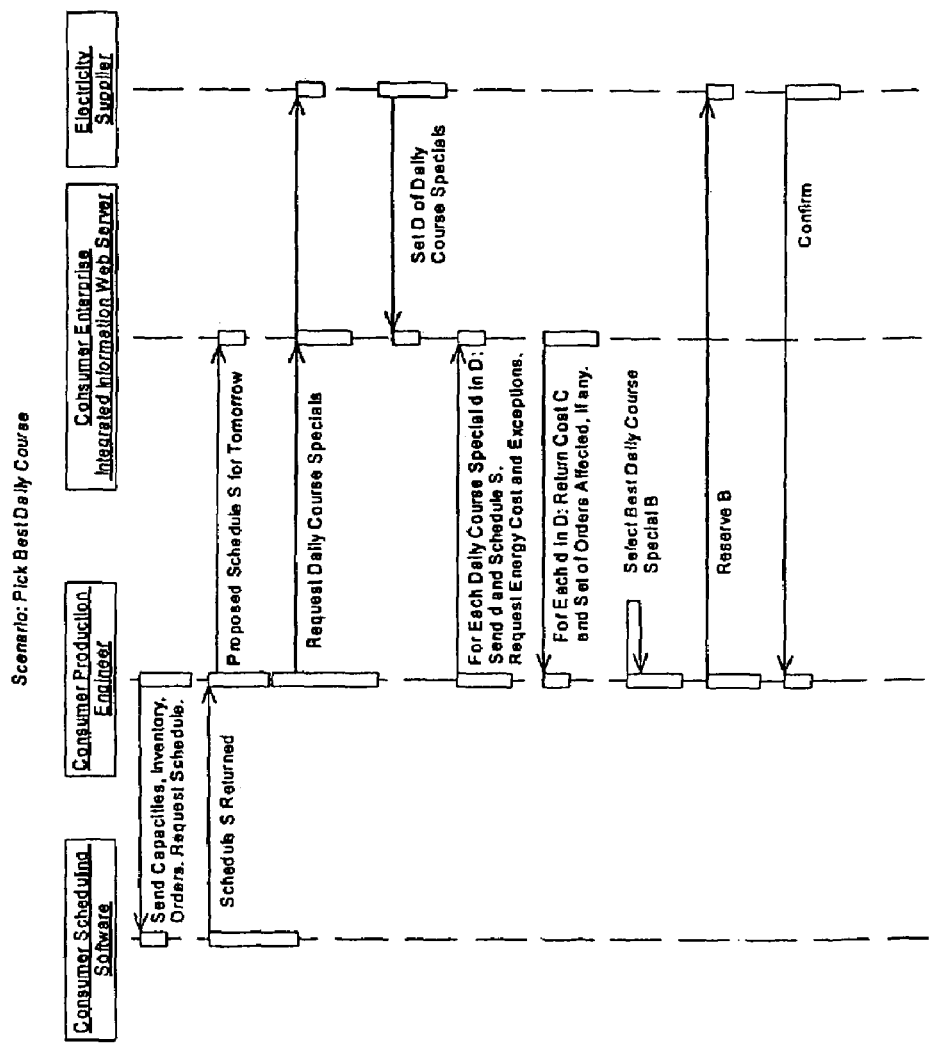
FIG. 4 shows a message sequence diagram for a general case.

FIG. 4 shows a message sequence diagram for the general Pick Daily Course case in the Consumer View diagram above (it is the oval at which all the arrows point ), in accordance with an aspect of the invention.

In the scenario shown in FIG. 4, a production engineer, for example, working for an industrial electric power consumer such as XYZ Company in accordance with an exemplary embodiment of the invention, uses a production scheduling software package which receives information about a set of orders, capacities of resources such as machines and people, and available inventory levels as inputs. It outputs a proposed production schedule S for tomorrow. This schedule is sent to an enterprise-wide integrated information web server maintained for the use of the industrial power consumer.

In this scenario for Pick Best Daily Course, interactions shown between Consumer Scheduling Software and Consumer Production Engineer include Send Capacities, Inventory Orders, Request Schedule; and Schedule S Returned.

Interactions shown between Consumer Production Engineer and Consumer Enterprise Integrated Information Web Server include Proposed Schedule S for Tomorrow; Request Daily course Specials; For Each Daily Course Special d in D: Send d and Schedule S; Request Energy Cost and Exceptions; and For Each of the D: Return Cost C and Set of Orders Affected, if any.

Select Best Daily Course Special B is internal to Consumer Production Engineer. Interactions shown between Electricity Supplier and Consumer Enterprise Integrated Information Web Server include Set D of Daily Course Specials.

Interactions shown between Electricity Supplier and Consumer Production Engineer include Set D of Daily Course Specials; Reserve B; and confirm.

It is herein recognized that an open question exists as to whether this server ought to be resident at an industrial power consumer site (due to the higher comfort of some consumers due to security concerns about sensitive data), or whether it ought to reside at the consumer's electric power supplier such as ABC Power. The advantage of an offsite web server is that the power consumer does not have to be concerned with the maintenance and support of additional new technologies in order to benefit from these new applications and services.

Using the integrated information web server, an employee of the electric power consumer such as, for example, the afore-mentioned Chief Engineer at XYZ Company logs in to the customer portal site of ABC Power and requests the daily course specials for tomorrow. Then, software accessible using the web server is used to calculate the electric power cost of executing the proposed production schedule for each of the daily course specials.

Also reported are any scheduled production steps that may not be completed (and the affected orders) due to any limits on electric power demand load given in a daily course.

Given this information, the consumer production engineer decides which daily course special is the best choice for tomorrow, and possibly makes adjustments to tomorrow's production schedule. Lastly, the production engineer places a reservation for the chosen daily course special with the electric power supplier and awaits a confirmation.

Note that a software package that can estimate the electricity cost of the schedules it constructs can be built from a conventional finite capacity scheduler software package and post-processor software that computes the electricity cost of carrying out the schedule constructed by the finite capacity scheduler. This sort of software package is shown in FIG. 5.

Figure 5:
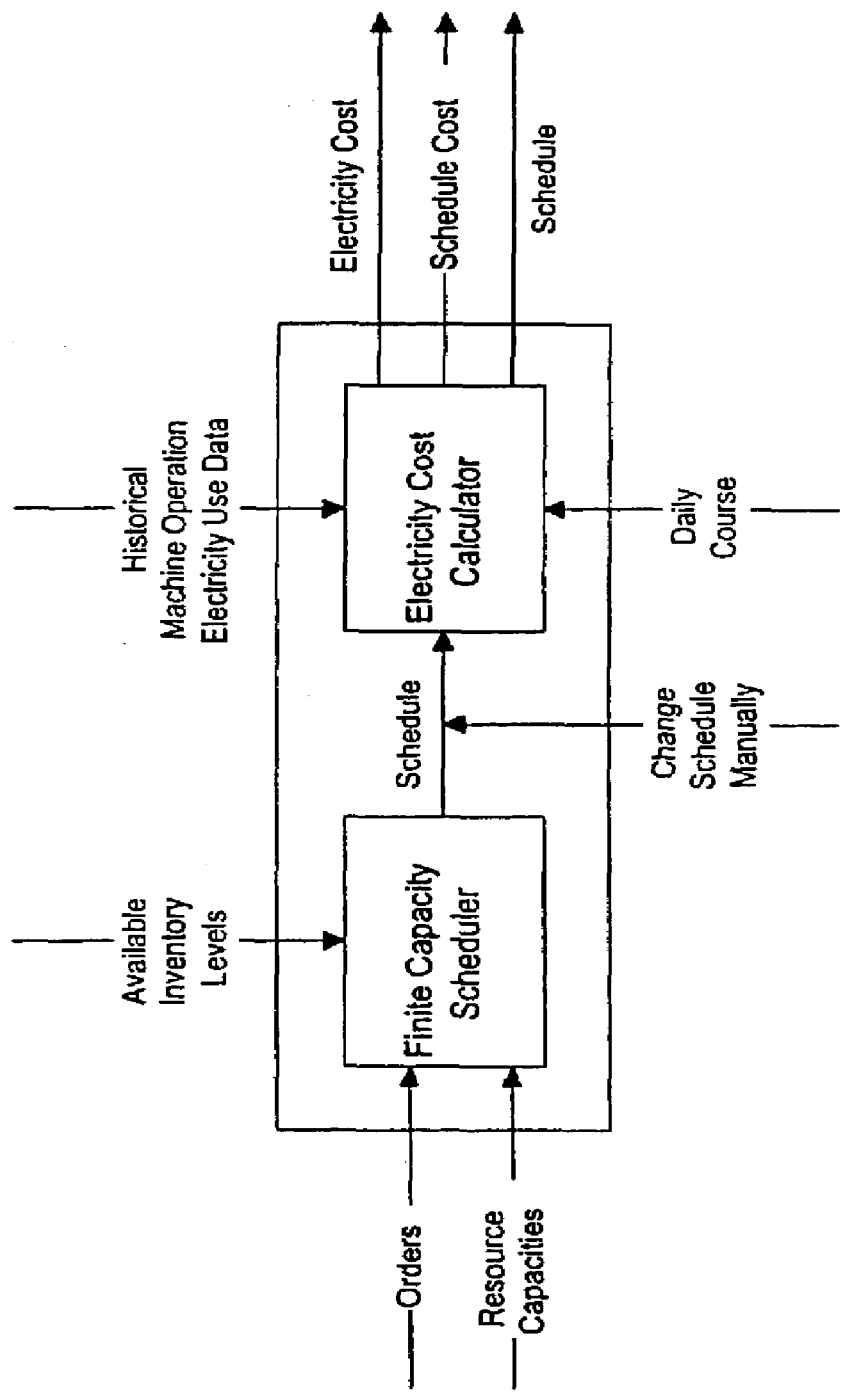
FIG. 5 shows a data flow diagram for a Finite Capacity Scheduler.

In FIG. 5, the Finite Capacity Scheduler is shown having inputs including Available Inventory Levels; Orders; and Resource Capacities, and providing a Schedule output to Electricity Cost Calculator, Schedule being subject to a selective application of the step of Change Schedule Manually. The Electricity Cost Calculator receives further inputs including Historical Machine Operation Electricity Use Data and Daily Course and provides outputs including Electricity Cost; Schedule Cost; and Schedule.

Inputs to the integrated software package include orders, available capacities for such resources as machines and people, available inventory levels, historical data showing electric power needed to perform each type of operation on each machine, and a daily course including a tariff for the electric power to be supplied. It is also within the contemplation of an aspect of the invention to allow manual adjustments to be made to a schedule as well, before it is input to the costing post-processor. Outputs include a production schedule, the cost of electric power projected to be consumed, and the total cost of carrying out this particular production schedule.

Figure 6:
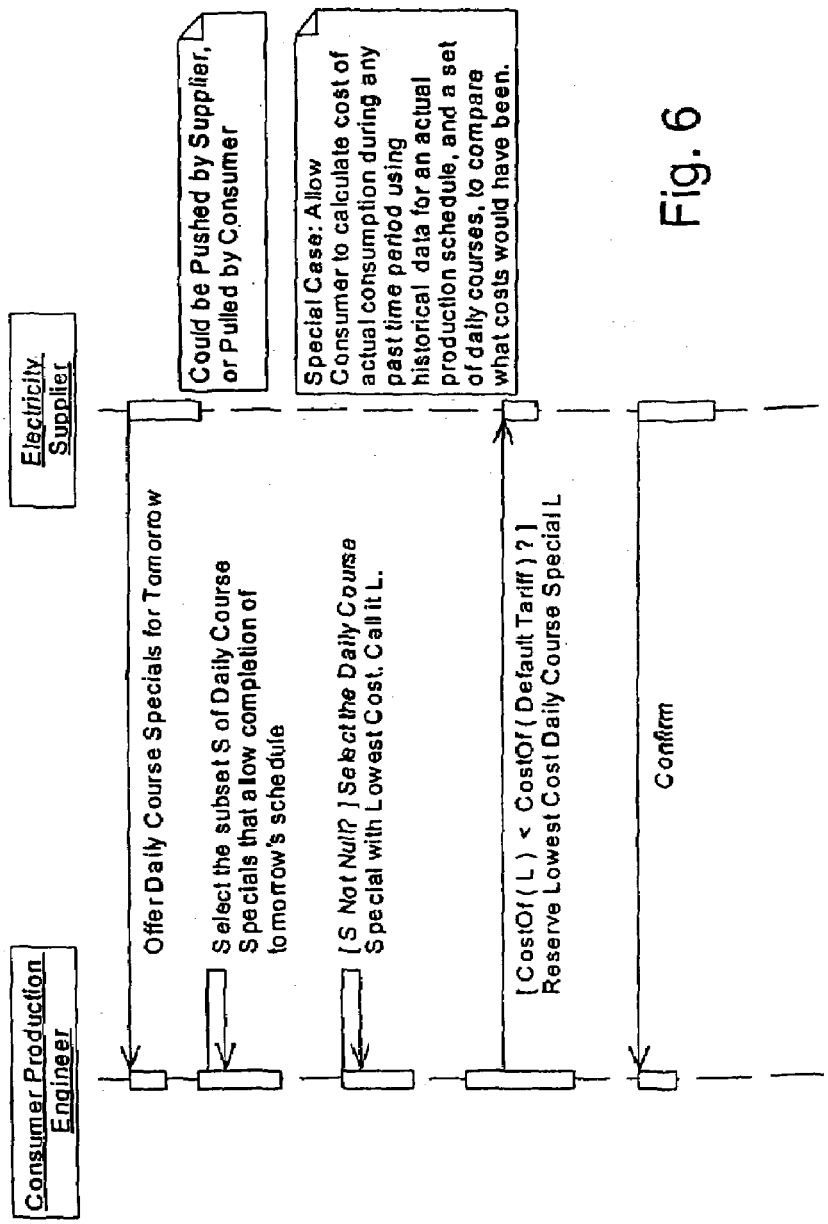

The details of Case 1 from the Consumer View use case are depicted in the message sequence chart shown in FIG. 6. In this case, it is assumed that no changes are made to the production schedule in an effort to reduce the cost of electric power. One of the daily course specials is chosen only if it results in a reduction in cost and the production schedule can be fulfilled in spite of any limits on electric power demand load specified in the daily course specials.

The lowest cost daily course special that still permits completion of the production schedule is chosen, as long as it is cheaper than the default tariff in effect.

In detail, FIG. 6 shows Pick Course CASE 1: Choose a Daily Course Special Tariff ONLY IF doing so reduces the cost of electricity. For this Case, no changes to the production Schedule are made.

Interactions are shown between Consumer Production Engineer and Electricity Supplier, including Offer Daily Course Specials for tomorrow. Consumer Production Engineer acts to Select the subset S of Daily Course Specials that allow completion of tomorrow's schedule and If S Not Null, Selects the Daily course Special with Lowest Cost. Call it L.

Consumer Production Engineer queries Electricity Supplier: [CostOf (L)<CostOf (Default Tariff)?] then acts accordingly to Reserve Lowest Cost Daily Course Special L. Electricity Supplier Confirms.

These actions could be Pushed by supplier, or Pulled by consumer. Special Case is: Allow Consumer to calculate cost of actual consumption during any part time and period using historical data for an actual production schedule, and a set of daily courses, to compare what costs would have been.

The same software used to do these computations can be used to calculate what the cost of electric power would have been in any past historical time period for which historical production data and electric power use meter data is available, using any of a set of daily course tariffs.

Note also that the availability of a set of daily course specials can be made known to electric power consumers either by energy suppliers:
1. broadcasting that news via the World Wide Web to customers likely to have an interest, or
2. placing availability information on the supplier Web site, to allow interested customers visiting that Web site to discover their availability.

As has been stated, the first of these methods is called an information push, while second method depends on customers pulling the information to get it.

Figure 7:
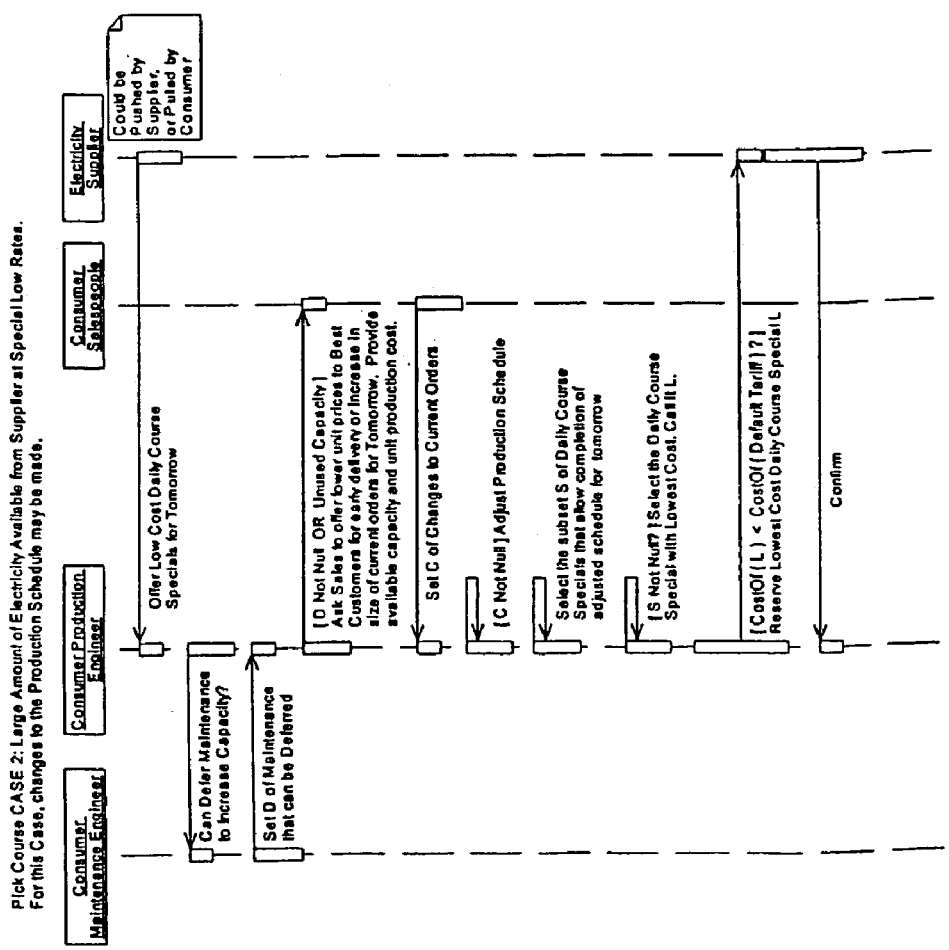

The details of Case 2 from the Consumer View use case are depicted in the message sequence chart shown in FIG. 7. In this case, it is assumed a large surplus of electric power, much greater than normal, results in daily course specials for tomorrow with very low rates being offered by the electricity supplier.

It is therefore in the best interests of the electric power consumer to adjust their production schedule, if possible, to take as full advantage as possible of the low electricity rates.

In detail, FIG. 7 shows Pick Course CASE 2: Large Amount of Electricity Available from Supplier at Special Low Rates. For this Case, changes to the Production Schedule may be made.

Electricity Supplier Offers to Consumer Production Engineer Low Cost Daily Course Specials for Tomorrow. Consumer Production Engineer questions Consumer Maintenance Engineer Can Defer Maintenance to Increase Capacity? Consumer Maintenance Engineer provides Consumer Production Engineer a Set D of Maintenance that can be Deferred.

Consumer Production Engineer and Consumer Salespeople interact: [If] [D Not Null OR Unused Capacity] Consumer Production Engineer asks Sales to offer lower unit prices to Best Customers for early delivery or for increase in size of current orders for Tomorrow and provides available capacity and unit production costs.

Consumer Salespeople provide Set C of changes to Current Orders.

If [C Not Null], Consumer Production Engineer adjusts Production Schedule. Consumer Production Engineer selects the subset S of Daily Course Specials that allow completion of adjusted schedule for tomorrow. If [S Not Null?] Selects the Daily Course Special with Lowest Cost. Call it L. If [CostOf (L)<CostOf (Default Tariff)?] Reserve Lowest Cost Daily Course Special L.

Electricity Supplier confirms to Consumer Production Engineer. The scenario could be Pushed by Supplier, or Pulled by Consumer.

It is also contemplated in accordance with an aspect of the invention that it might be possible that maintenance tasks that were scheduled to take some resources out of service tomorrow, could be safely deferred until a later date. This would provide greater capacity. If any scheduled maintenance cannot be deferred, perhaps there are orders that make better use of the available capacity tomorrow that could be swapped with the orders that are now scheduled for production tomorrow.

As was previously stated, two ways to make use of any additional available capacity are:
1) complete and deliver one or more orders earlier, or
2) negotiate an increase in order lot size at reduced unit price.

Figure 8:
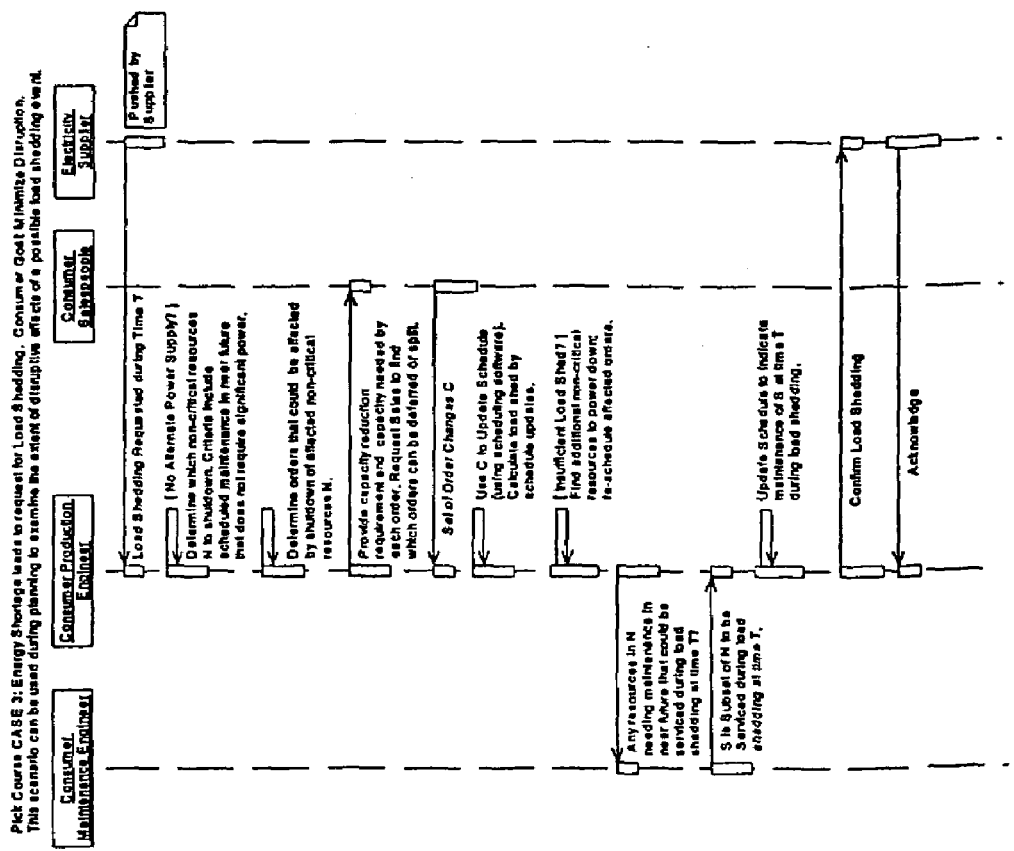

The details of Case 3 from the Consumer View use case are depicted in the message sequence chart shown in FIG. 8. In this case, we assume that demand for electric power is higher than expected. If no alternative source of power is available then load shedding will be needed, to reduce demand.

In detail, FIG. 8 shows Pick Course CASE 3: Energy Shortage leads to request for Load Shedding. Consumer Goal Minimize Disruption. This scenario can be used during planning to examine the extent of disruptive effects of a possible load shedding event.

This scenario is pushed by an Electricity Supplier who communicates to a Consumer Production Engineer that Load Shedding is Requested during time T. The Consumer Production Engineer verifies whether an Alternate Power Supply is available and if not, determines which non-critical resources N to shutdown. Criteria include scheduled maintenance in the near future that does not require significant power. The Consumer Production Engineer determines orders that could be affected by shutdown of affected non-critical resources N and provides Consumer Salespeople with a capacity reduction requirement and the capacity needed by each order and requests Sales to find which orders can be deferred or split. Consumer Salespeople provide a Set of Order Changes C to the Consumer Production Engineer.

The Consumer Production Engineer uses C to Update Schedule (using scheduling software) and calculates the load shed resulting from the schedule updates. If insufficient load is shed, the Consumer Production Engineer finds additional non-critical resources to power down; and re-schedules affected orders. [The Consumer Production Engineer asks the Consumer Maintenance Engineer whether there are any resources in N needing maintenance in near future that could be serviced during load shedding at time T. The Consumer Maintenance Engineer provides S which is a Subset of N to be Service d during load shedding at time T.

The Consumer Production Engineer updates the schedule to indicate maintenance of S at time T during load shedding and confirms Load Shedding to the Electricity Supplier who acknowledges [receiving the load shedding confirmation from the Consumer Production Engineer].

A load shedding scenario can be examined at the time a number of alternate daily courses are being considered. The goal is to determine during planning, how much the production schedule and delivery commitments might be affected should load shedding become necessary, for each daily course that involves unfirm power supply reservations.

One way to reduce electric power demand load is to schedule maintenance service of non-critical equipment that does not need much electric power during servicing, for the time period when load must be shed. Perhaps such maintenance service was already scheduled for some other time period in the near future. Perhaps it can be rescheduled for the time period when load must be shed, without major disruptions and without major waste of the residual life capacity of that equipment estimated to remain before maintenance service must be performed.

As a result of performing maintenance service earlier, some operations on one or more orders might be deferred.

The sales representatives servicing the customers whose orders will be affected should be involved in rescheduling decisions, if orders with firm delivery dates might be delayed. Those customers should be consulted to discover if expected delays can be tolerated by the affected customers, or whether orders can be split, such that a partial order with smaller lot size can be delivered on the agreed delivery date, with the remaining part of the order to follow at a later date to be agreed upon. As one possibility, a lower per-unit price can be offered as an incentive. This additional cost would be absorbed by the industrial electric power consumer. Orders without firm delivery dates can be postponed without consulting customers.

A simple production schedule might be adjusted as shown in FIG. 9, which shows current Schedule items and a Proposed Revised Schedule for 3 days, by way of example.

If sufficient capacity could not be freed by rescheduling maintenance service planned for the near future, or sufficient customers with firm delivery dates could not be convinced to accept later delivery of at least a portion of their orders, then the applicable Maintenance Department could be consulted to find alternative equipment that was not yet scheduled for maintenance service, but which could be serviced without major disruptions and without major waste of residual life capacity estimated to remain before maintenance service must be performed.

When a set of equipment meeting these conditions is found, some set of orders would be affected by performing maintenance service during the time period in which load shedding is to occur. As above, the customers whose orders specify a firm delivery date should be consulted by the applicable Sales Department to attempt to renegotiate those delivery dates to allow for an expected delay.

In accordance with an exemplary embodiment of the invention, the next set of scenarios are all part of the Electric Power Supplier View use case. In detail, FIG. 10 shows a supplier view use case diagram enumerating 4 sub-cases. Electricity Supplier, Electricity Exchange, Electricity Consumer, Electricity DisCo, GenCo, etc. are shown in relation to the general Supply Power. Four sub-cases are enumerated in the use case diagram shown in FIG. 10. The 4 sub-cases are: Supply Power CASE 1: Surplus Power; Supply Power CASE 2: Power Shortage; Supply Power CASE 3: Use Consumer Estimates; and Supply Power CASE 4: Use Actual Consumption. Each of these sub-cases is depicted in a separate message sequence chart in FIGS. 11–14, following.

Figure 11:
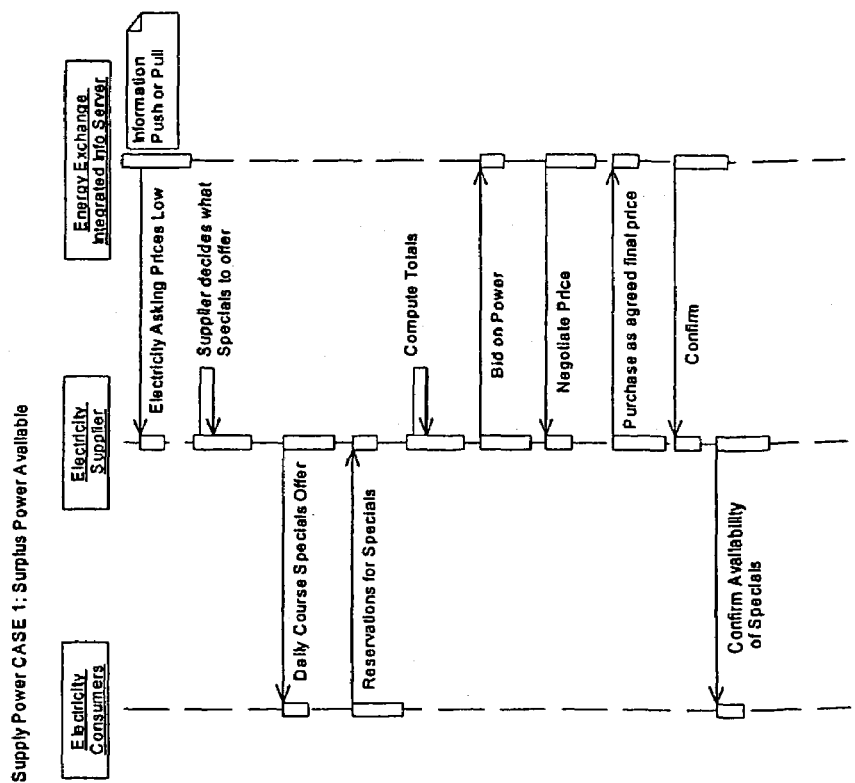

The message sequence chart shown in FIG. 11 depicts Supplier View Case 1 in which a power surplus is found to exist. Due to a power surplus on an energy exchange, the price of additional electric power is low. As a result, suppliers can offer special low-cost daily courses.

FIG. 11 shows Supply Power CASE 1: Surplus Power Available. Energy Exchange Integrated Info Server indicates to Electricity Supplier that Electricity Asking Prices are Low. This information can be pushed to electricity suppliers or pulled by them as desired.

The Electricity Supplier decides what Specials to offer. The Electricity Supplier makes Electricity Consumers a Daily Course Specials Offer to Electricity Consumers. Electricity Consumers communicate to Electricity Supplier with Reservations for Specials. The Supplier computes totals, and communicates aBid on Power to the Energy Exchange Integrated Info Server. The Electricity Supplier negotiates a price with the Energy Exchange Integrated Info Server and purchases at the agreed upon final price. The Energy Exchange Integrated Info Server confirms completion of the transaction. The Electricity supplier confirms the Availability of Specials to electricity consumers.

Figure 12:
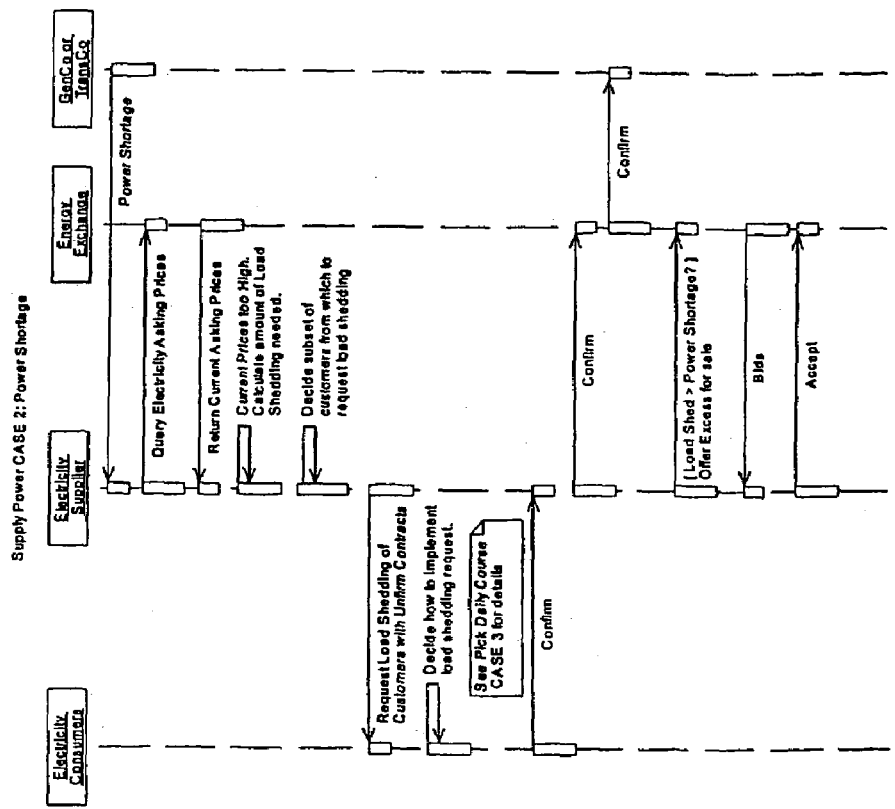

Supplier View Case 2 is depicted in the message sequence chart shown in FIG. 12, wherein a shortage of electric power due to under-generation, overuse of transmission line capacity, or overuse of electric power locally or elsewhere, leads to the need for load shedding. In the absence of availability of additional electric power at reasonable prices on energy exchanges or elsewhere, electric power suppliers such as ESCos can request any of their customers with unfirm contracts to shed electric power demand load, up to the maximum amount specified in their contract.

Figure 13:
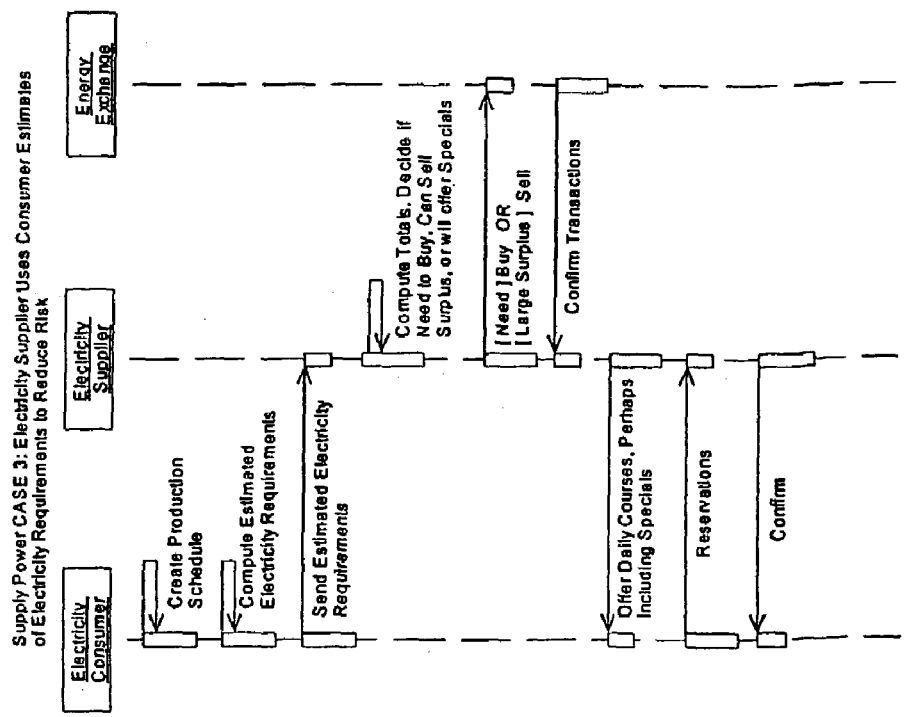

In detail, FIG. 12 shows Supply Power CASE 2: Power Shortage. A GenCo or TransCo communicates a Power Shortage messaage to Electricity Supplier who queries Electricity Asking Prices of Energy Exchange. Energy Exchange returns Current Asking Prices. Electricity Supplier finds Current Prices too High, calculates the amount of Load Shedding needed, decides the subset of customers from which to request load shedding, and communicates to these. Electricity Consumers decide how to implement the load shedding request and confirm to Electricity Supplier their intent and ability to comply with the request. Further details on this step are shown in FIG. 13. Electricity supplier confirms their ability to comply to GenCo or TransCo. In the event Electricity Supplier finds that the load shed exceeds the power shortage, Electricity Supplier offers the excess for sale to Energy Exchange who bids for the excess. Electricity Supplier then optionally accepts bids.

As hereinbefore mentioned in reference to an exemplary embodiment of the invention, customers with firm reservations are guaranteed to receive the full amount of the electric power specified in their contract no matter what disruptions cause an electric power shortage to the electric power supplier. Only those customers with unfirm contracts can have the level of electric power supplied to them cut by up to the amount specified in their contracts.

Note that if more than the required load can be shed, the difference can be offered for sale on an energy exchange. This could result in windfall profits if the current supply of electric power being traded on the exchange is considerably less than the current demand for electric power. This is likely to be the case when load shedding is required.

If consumers were willing to supply estimates of their electric power requirements for tomorrow, electric power suppliers could use this information to reduce risk while serving consumers' needs better. In return for this information, electric power consumers would get some benefits such as a lower price for their electric power. This situation is depicted in Supplier View Case 3 shown in FIG. 13. In detail, FIG. 13 shows Supply Power CASE 3: Electricity Supplier Uses Consumer Estimates of Electricity Requirements to Reduce Risk. Electricity Consumer creates a Production Schedule, computes Estimated Electricity requirements and sends this to Electricity Supplier. Electricity Supplier computes totals, decides if there is a Need to Buy, if they Can Sell Surplus, or will offer specials. If a Need is found, Electricity Supplier buys, or if a Large Surplus is found, Electricity Supplier sells from/to Energy Exchange who confirms the transactions. Electricity Supplier offers Daily Courses to Electricity Consumer, perhaps including Specials. Electricity Consumer optionally makes a reservation with Electricity Supplier who confirms.

In accordance with an exemplary embodiment of the invention, actual electric power consumption data (metering data) is analyzed to discover patterns of use across such categories as geographical regions, industry type, or ranges of amount of electric power used. Those organizations desiring this information could subscribe to a data service. Aggregate electric power data from a set of consumers matching a desired pattern specified by each subscriber would then be sent. Who the individual consumers are would never be revealed. These sorts of longer term analyses are depicted in Supplier View Case 4 shown in FIG. 14.

Figure 14:
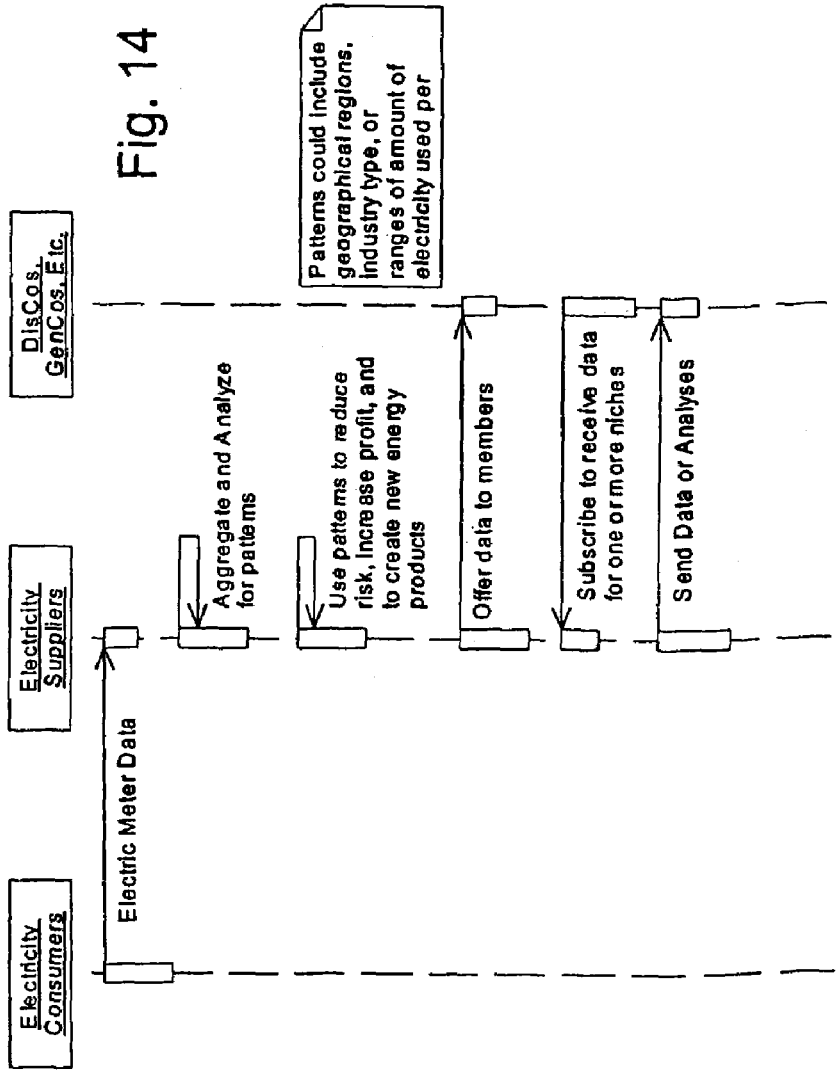

In detail, FIG. 14 shows Supply Power CASE 4: Use Actual Electricity Consumption Meter Data to Reduce Risk, increase Profit, and Develop New Energy Products Electricity Consumers communicate Electric Meter Data to Electricity Suppliers. Electricity Suppliers aggregate and analyze for patterns, then use patterns to reduce risk, increase profit, and to create new energy products. Patterns could include geographical regions, industry type, or ranges of amount of electricity used per day. Electricity suppliers communicate data to members, DisCos, GenCos, etc. DisCos, GenCos, etc. subscribe to receive data for one or more niches from Electricity Suppliers who then send Data or Analyses.

A number of special services are shown in the use case shown in FIG. 15. In detail, FIG. 15 shows a number of special Roles in this use case include Electricity Consumer, Electricity DisCo, Genco, Etc., Consumer Electric Meter, and Repair Person Provide Special Services such as Diagnostics, and Power Monitoring and Diagnostics.

In accordance with an exemplary embodiment of the invention, meters are used to supply diagnostic data. This information could be used to alert consumers to problems and to schedule repair visits via the World Wide Web. A message sequence chart depicting a diagnostic scenario is shown in FIG. 16.

Figure 16:
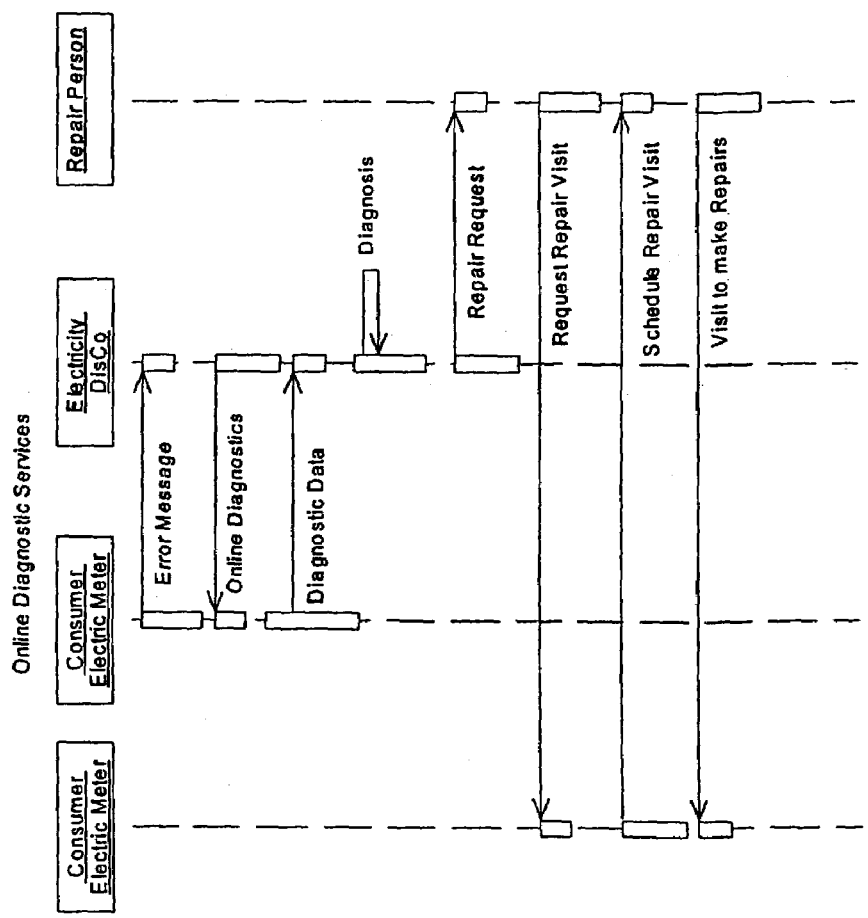

In detail, FIG. 16 shows Online Diagnostic Services. Consumer Electric Meter sends an Error Message to Electricity DisCo who responds with Online Diagnostics. Consumer Electric Meter sends Diagnostic Data to Electricity DisCo. Electricity DisCo arrives at a diagnosis and sends a repair request to Repair Person. Repair Person sends Electric Consumer a Request for a Repair Visit. Repair Person and Electric Consumer schedule a repair visit and Repair Person visits to make repairs.

The online diagnostics are queries and tests sent automatically to a smart meter that performs them automatically and returns diagnostic data about its condition and health. A diagnosis is determined either by hand or using a software diagnosis package. Repairs are then scheduled and carried out.

Figure 17:
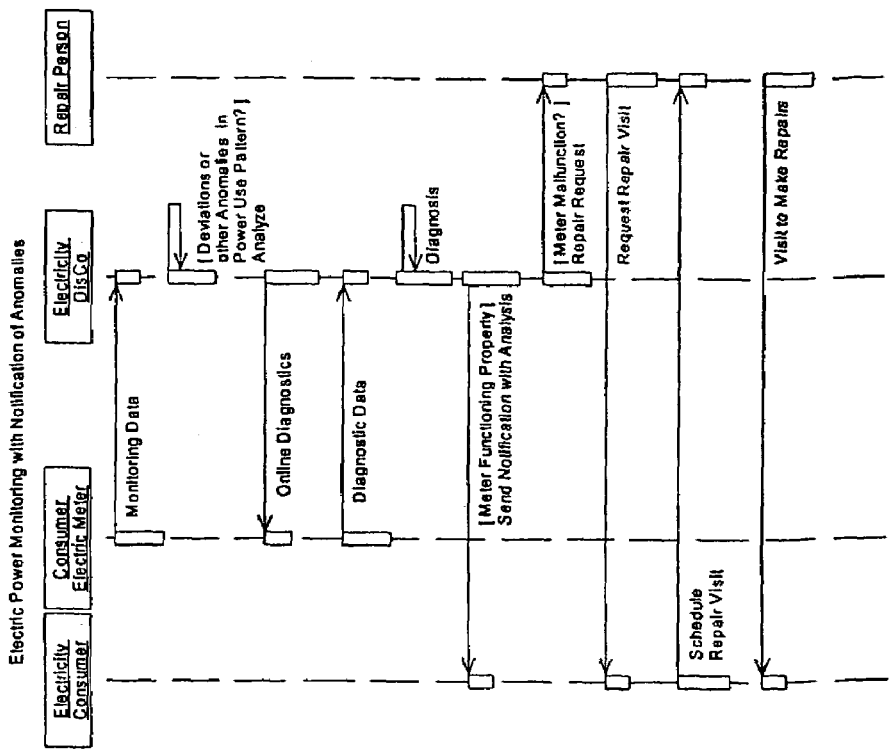

The message sequence chart shown in FIG. 17 depicts the monitoring of electric power use and the notification of a consumer if there are any deviations from their expected power consumption. In accordance with an exemplary embodiment of the invention, warnings about anomalies are optionally sent via email. This can arrive at an ordinary desktop computer, a palmtop device, a smart phone, or a pager. Unusual power use patterns could be an indication of a problem with one or more pieces of equipment, simply a need to adjust machine settings, or an indication that schedules might be revised. Subsequent adjustments or maintenance service can result in savings for electric power consumers.

In detail, FIG. 17 shows Electric Power Monitoring with Notification of Anomalies. Consumer Electric Meter provides Monitoring Data to Electricity DisCo who monitors for and analyzes Deviations or other Anomalies in Power Use Pattern. In such an event, Electricity DisCo sends Online Diagnostics to Consumer Electric Meter and receives back Diagnostic Data and arrives at a diagnosis. If the Meter is functioning properly, Electricity DisCo sends a Notification with analysis to Electricity Consumer. If the Meter is not functioning properly, Electricity DisCo sends Repair Request to Repair Person who schedules a repair visit and visits Electricity Consumer to Make Repairs.

Following is a set of fictitious illustrative scenarios covering various situations and approaches to problem solution and optimization of resources. The scenarios are illustrative and will be helpful in gaining a more thorough understanding and developing a clearer picture of additional aspects of the invention.

As has been explained above, close coordination across enterprises is most important in attaining the goals discusses above. In one aspect of the invention, a goal is to support close coordination between energy suppliers and customers through information sharing and integration so as to:

enable energy customers to easily optimize their total operating costs, including rapidly fluctuating costs of energy;

improve the ability of energy suppliers and customers to optimize their operations in the presence of fluctuating price and supply of energy; and allow energy costs to be optimized across the entire energy supply chain.

A better economic model for the entire system is one in which the energy demand of enterprises is elastic. If an enterprise has elastic demand, it can take advantage of rapidly changing energy prices by flexibly adjusting its energy consumption. A business that can do this can run more profitably than one with inelastic demand, all other things being equal. If enterprise-level elastic demand becomes common in a deregulated market, most enterprises will eventually need to have it, in order to stay competitive.

An object of the present invention is to focus on providing the technical foundations for this scenario.

FIG. 18 is helpful to understanding information sharing across an energy supply chain, showing the concepts of:

Vision: Encourage the sharing of data between enterprises

Goal: Global optimization of the entire energy supply chain to the benefit of all, with initial focus on coordination between suppliers and Technology: Information exchange between different application domains and between supply chain partners, Global access to desired information, and New and improved applications To the left in FIG. 18 is the energy supply chain. In accordance with another aspect of the present invention is to use cross enterprise information to help globally optimize the cost and risk to each enterprise in this chain. One key to this is making the relevant information available where and when needed and in the correct form.

It is herein recognized that the following Digital Plant Core Concepts need to be addressed and taken into account:

How can a Manufacturing Execution System (MES) allow people in different roles to cooperate to optimize profitability:

Without anyone suffering information overload?

In a cost-effective way?

How can energy customers and suppliers co-operate to improve the profitability of both?

With regard to each of the foregoing points:

1. It is recognized that optimizing profitability is not a facile or simple task. Plant managers have generally indicate d that it would be very helpful to find ways to help decrease their infrastructure costs. They don't have any extra time, personnel, or money to spend on installing and maintaining software and networks. It is therefore in accordance with another aspect of the present invention to provide solutions that require less, not more, effort and money to maintain infrastructure.

2. A large-scale energy customer can leverage rapidly changing energy rates for optimum profitability by using more energy when the rates are low. But this must be factored in to the total cost of production. In accordance with another [aspect of the present invention, it is recognized that optimizing on a global scale provides better results than the suboptimal results from attempting to optimize only locally.

3. Suppliers already use customer load profile data to increase their profitability; however, in accordance with another aspect of the present invention, , a method is provided for getting additional data from customers that will help better predict near-term load and to do it in a way that the customer will prefer.

4. Energy customers and suppliers can co-operate to improve the profitability of both by agreeing to share information and use the shared information to optimize their processes. Information isn't the primary product of either, but it's useful to both sides to share, as will become more clear in the description of the present invention.

FIG. 19 shows a possible pattern for ad-hoc information flow costs in lost efficiency, involving an Energy Supplier and a Production Engineer.

Typically, under prior art practice, the production engineer here has only the telephone and email to help him when he talks to his peers. He's going to lose too much time explaining to them what delivery he wants to change and by how much, which maintenance item he wants to defer, etc. So he's most likely not going to bother. As a result, the enterprise misses an opportunity to take advantage of the special rates. Production is more expensive than it needs to be.

Core concept 1 in the context of a Digital Plant Demo can be outlined as follows, by way of example:

Leverage Portal Technology
  Role-based views: marketing, production, maintenance, ESCOs, etc., presented as portals Leverage Extranet Technology
  Trading partner portals for energy and other suppliers, customers, etc.
    XML-based automated negotiation technology
  The Application Service Provider (ASP) business model reduces the need for in[-]plant software expertise for software system development and maintenance Standardize Domain-Specific XML Framework(s) for Information Exchange Between Enterprises
  Public organizations that could be involved include the Organization for the Advancement of Structured Information Standards (OASIS), XML.ORG, IDEAlliance, BizTalk, other standards organizations.
  Proprietary standards are considered by some to no longer be an advantage but rather to have now become a disadvantage.

Using XML technology, role-based portals can be built for either human (Web browser) or machine (raw document) use. The same information can be used in either way.

Comments from plant managers typically indicate that they don't want to spend a lot of time managing network and application infrastructure. The Application Service Provider (ASP) model can help. Using an ASP portal exposed on the enterprise's extranet, the software within the enterprise can be maintained by an outside provider. The enterprise does not have to hire as many software experts. Furthermore, since the ASP tends to concentrate expertise, small and medium scale enterprises will likely get better service than if they tried to hire their own experts.

FIG. 20 shows an example of a Role-Based Portal Concept with the components of Energy Supplier, Application Service Provider, Sales, Production Engineer, and Maintenance Engineer, with the corresponding fields of Finance, Production, and Maintenance, accessible from both Extranet, and Intranet sectors. This shows the beginnings of a layered, enterprise-wide architecture for information integration.

People with internal roles (marketer, production engineer, maintenance engineer) will typically have their own internal Web portals, which they use to interact with each other and with their individual parts of the enterprise. The portals would come preconfigured to support their roles. The role-players may customize the portals to adapt them to local procedures and their own workstyles.

Through extranets, portals can also be extended to the enterprise's trading partners, such as energy suppliers and application service providers.

FIG. 21 shows, by way of example, how a Role-Based Portal for a Production Engineer might appear. In FIG. 21, production schedules are visually integrated with graphical charts of production engineering information (from many possible sources). Other role-players include: Comptroller, Sales, Maintenance manager, Customers (via extranet), Energy suppliers, and Other trading partners Portals are preferably Web-based, so they can be accessed anywhere within the enterprise intranet, including through wireless technology. The engineer would not be tied down to a particular PC. Using wireless technology, engineers would be free to go to wherever thry are physically needed.

The production engineer's portal has all the information which is relevant to the job—and nothing else. The appearance of the maintenance engineer's and marketing manager's portals would be quite different. But, unlike present technology, the role-players would not be required to learn how to use and interpret each others' portals in order to cooperate.

FIG. 22 shows an example for sharing data and messages. Here, the production engineers can view many different kinds of pre-integrated information or create their own integrations (similar to Excel spreadsheets. Using XML technology, messages are visually linked to the info they refer to—as they are displayed to the role-player, in his or her own portal.

Visual tools to create integrations are beginning to become available now. By way of example, not intended to be limiting in any way, see IBM Alphaworks' "Visual XML Transformation" tool. It lets users integrate XML document definitions (without programming, like an Excel spreadsheet), and creates XSLT transforms. This will allow non-programmers to implement and maintain business logic.

By way of further example, messages can be sent through email, through the Web's HTTP mechanism, or by any other convenient means. They include XML Xpointers that refer to the underlying documents that are displayed in the portal.

The attached pop-up note shown in FIG. 10*a* is just an example of how messages might be visually linked to the graphic objects in a web browser. The actual appearance might be different, depending on implementation issues.

FIG. 23 indicates that Role-players need help to put information together. Even when the production person can explain everything to his peers in a reasonable time, he still doesn't really know how much a schedule change will save on total production costs, or whether it might get him in trouble later. Typically a decision might be made that it is better to do nothing than to do the wrong thing: in such a case, the enterprise may lose another opportunity.

Core concept 2 in the context of a Digital Plant Demo can be outlined as follows, by way of example:

Integrate near-term production schedules with time-varying utility and resource costs, including:
  Past production schedules
  "What if" production schedules for the near future
  Historical data about usage of non-fixed-asset resources:
    Electric power usage (metering data), raw materials, personnel, air pollution, etc.
  Time-varying price schedules for non-fixed-asset resources:
    "Daily courses" for electricity, materials prices, labor rates, pollution credits
    Resource suppliers may offer several alternative price schedules A utility customer can select the production schedule and resource price schedules that optimize the total cost of production.

When cost schedules vary greatly over time and don't track each other, enterprises need automated help in putting everything together into a total cost of production.

Another key point is that energy demand is now inelastic, which causes situations like the afore-mentioned case of $7000 per megawatt hour. This is largely because enterprises cannot adjust their load according to price with current information technology. If enterprises can reliably predict energy consumption, and use that data to engineer their production schedules, energy demand would become more elastic.

FIG. 24 shows, by way of example, steps for estimating energy usage:

Three XML base documents are referenced:
  Past production schedules
  Past load profile data
  Daily courses
They form four XML derived documents:
  Estimated energy use for production
  Estimated energy cost
  Actual energy cost
  Variance from the estimate A key point here is the difference between base documents and derived documents. These terms will be further considered in the description of the information integration architecture.

FIG. 25 shows information integration and base documents layers in an exemplary arrangement of parts in an exemplary embodiment, including the elements of:

Energy Supplier, Application Service Provider, Comptroller, Production Engineer, and Maintenance Engineer, with respective components including (an External network), Finance, Production, Maintenance, an Extranet, a Firewall, and an Intranet.

In effect, FIG. 25 shows some parts of the intermediate layers of the information integration architecture. The derived documents are light blue and the base documents are light green.

It is noted that the arrangement of parts in FIG. 25 is specific to the exemplary non-limiting embodiment being described and another implementation or embodiment may result in different parts in a different arrangement.

FIG. 26 shows an example of the layered information integration architecture as a whole—in a summary structural view. Components shown include Extranet Portals, Role-Based Portal Layer, Information Integration Layer, Firewall, Base Document Layer, Extranet, Communication Layer, and Legacy Translation Layer.

Core concept 3 in the context of a Digital Plant Demo can be outlined as follows, by way of example:

Information on Expected Utility Usage is Itself a Product
  Customers can join "customer circles" and provide near-term schedules of expected energy usage to their energy supplier (in return for discounts)
    (Appropriate privacy agreements typically should be in place between the customer and the supplier)
  Suppliers can use this data to schedule their purchases of energy and transmission capacity more efficiently
  Suppliers can also sell the expected data as an information product to GenCos, DisCos, brokers, or other suppliers
The "Expected Usage" Information Product Can Be Bought, Sold, and Traded Between Enterprises For electric utility deregulation, this is an important idea. Utility usage estimates for the near term can be gathered from enterprises and sold "up" or "across" the supply chain.

FIG. 27 shows an example of load history and forecast information trading, involving the elements of Heavy Industry Circle, Transportation Circle, Energy customers supplying load data and predictions and wherein an energy supplier assures customer privacy, by summarizing customer circle data, and information trading partners trade summarized customer circle data.

This is by way of example only—many other customer circles are possible: various manufacturing sectors, white-collar work, retail stores, and government are a few. At minimal cost, many energy customers can enter into agreements, which reduce their operating expenses. This will be a powerful incentive to join and provide information.

Customer circle energy usage estimates can be aggregated to each other up the supply chain, too.

FIG. 28 shows an example of Method I for Customer Circle Based Aggregate Load Estimation, using historical meter data. This utilizes Historical Load Profiles (up to last month) for components including hypothetically named Aluminum Smelting Customer Circle, Pharmaceutical Customer Circle, XYZ Customer*Note that no XYZ Customer appears in the diagram, Pulp & Paper Customer Circle, as well as Variance and other Risk Parameters, as inputs to an ESCo Aggregate Load profile Estimator providing an Aggregate Load Estimate as output.

In the past, power utilities used load profiles contained in historical meter data along with historical weather data to produce aggregate load estimates.

FIG. 29 shows an example of Method 2 for Customer Circle Based Aggregate Load Estimation Using Historical and Near Term Actual Meter Data. The Key indicates the lines used for Historical Load Profiles (before today) and Near Term Meter Data (today).

The diagram involves, by way of example, hypothetically owned Aluminum Smelting Customer Circle Load Model, Pharmaceutical Customer Circle Load Model, XYZ Customer*Note that no XYZ Customer appears in the diagram, Plastics Customer Circle Load Model, Pulp & Paper Customer Circle Load Model.

Inputs from these entities and Variance and other Risk Parameters for Aggregate and for each Customer Circle are inputted to an ESCo Aggregate Load Profile Estimator to provide an Aggregate Load Estimate as output.

More recently, the technology to remotely acquire meter data frequently has become available. Aggregate load profile estimates can employ a load model based on historical meter and weather data. Near term meter data and current calendar day are inputs that enable the model to produce a load profile estimate as output.

A further refinement would allow the near future load profile estimates provided by individual power consuming customers to be used in addition to improve the accuracy of aggregate load profile estimates."

FIG. 30 shows Customer Circle Based Aggregate Load Estimation for Method 3: Using Historical and Near Term Actual Meter Data and Near Future Load Profile Estimates, where customer circles provide inputs to an ESCo Aggregate Load Profile Estimator which also receives Variance and other Risk Parameters for Aggregate and for each Customer Circle to provide an Aggregate Load Estimate.

Next, a series of short scenarios will be used to further illustrate how parts of this invention might be used in practice.

Scenario 1 involves adjusting the Production Schedule of an energy consumer that is a customer of an energy supplier to take advantage of special energy rates being offered by that energy supplier; in this scenario, we look inside the business operations at XYZ Customer, a hypothetical manufacturing company which buys energy from ABC Power, a hypothetical ESCO.

FIG. 31 shows that at the ESCo there is a greater energy supply than needed. For example, this could become known by means of a message sent to ESCo staff filling a power load management role by an automatic monitoring system. That message might contain information such as the following, in accordance with the present exemplary scenario and embodiment:

"To: WXY Power Management
From: System

Note the large surplus aggregate energy supply above the aggregate estimated load between 1 and 3 PM today."

The Power Load Management Role has responsibility for:
monitoring the aggregate estimated load profile; and
deciding what action to take when estimated load does not closely match supply;
Actions can include:
making special offers to consumers;
alerting the supply management desk to attempt to sell or buy power; and
informing consumers of the need for load shedding.

In FIG. 32, the ESCo Offers a Special Tariff to Plastics Customer Circle. For example, this could by a message such as the following, in accordance with the present exemplary scenario and embodiment:

"To: Load Management
From: Supply Management

Note the large surplus aggregate energy supply above the aggregate estimated load between 1 and 3 PM today. Due to the current low power market price, I suggest you offer a special tariff to some of your good customers."

Because the current market price of electric power is below the average cost of the energy supplier's current power supply, the load management specialist decides to make a special offer to one or more of the customer circles being served by this ESCo.

As shown in FIG. 33, production engineer learns of a special on energy. For example, this could by a message such as the following, in accordance with the present exemplary scenario and embodiment:

"To: J. Smith, XYZ Customer
From: J. Doe, ABC Power

Due to a surplus power supply, ABC Power is offering an attractive rate for unfirm power this afternoon to members of the Plastics Customer Circle, shown in the table below. Please visit the ABC Power Information Portal for details."

We see here the production engineer's portal. ABC Power's offer to XYZ Customer is a business-to-business message in XML format. J. Smyth's message is attached to the daily course document via an Xpointer.

As shown in FIG. 34, Production Engineer Adjusts Schedule but a Maintenance Task Conflicts. For example, a message such as the following can follow, in accordance with the present exemplary scenario and embodiment:

"To: J. Smith, production Engineering
From: Scheduling system

WARNING

The Scheduled time of maintenance task WINCE4SP7 conflicts with the resource requirements of job PRODUAC99B24.

Its execution time cannot be changed automatically, because it is locked."

FIG. 35 shows that production engineer comparing proposed schedules. The production engineer realizes that the offer only makes sense for him if he can defer some maintenance tasks. He sends a message to the maintenance engineer, with a link to the task that needs to move. The message is linked to the schedule item in the base schedule document, and appears linked to the corresponding item in the maintenance engineer's view As shown in FIG. 36, Maintenance Engineer is asked to defer a task. For example, this could be communicated by a message such as the following, in accordance with the present exemplary scenario and embodiment:

"To: Maintenance
From: J. Smith, Production Engineering

I'm trying to take advantage of some low power rates, but your scheduled execution time of task WINCE4SP7 conflicts with a production job I want to run on Production Line 1.

Could this maintenance task be deferred?"

Similarly, the maintenance engineer's reply refers to the schedule item in the production engineer's view. This represents propagation of information back to the coordinator who is still at the customer.

As shown in FIG. 37, production engineer gets the response. For example, this could be communicated by a message such as the following, in accordance with the present exemplary scenario and embodiment:

"To: J. Smith, Production Engineering
From: Maintenance

I've deferred the installation until tomorrow, but I can't slip it beyond that. We need Service Patch 7 in place to fix problems with Service Patch 6."

Now the production engineer needs to check with Sales. Sales' view of the plant schedule is very condensed (or abstracted)—factory floor details don't appear, but order entry, production, and delivery dates do. Again, the production engineer sends a message that refers to the base document. The message appears linked to the corresponding schedule item in the marketing manager's portal.

As shown in FIG. 38, sales department considers production engineer's question about early delivery. For example, this could be communicated by a message such as the following, in accordance with the present exemplary scenario and embodiment:

"To: Sales

From; J. Smith, Production

I can save some money on lower power rates by moving the completion date of some production orders up by one day, or by making a bigger lot size of some production jobs already scheduled for tomorrow. Would either of these changes help one of your customers?

Also, could we revert to the original schedule in case we need to shed load?"

This, again, is an exemplary situation illustrative of possiblities—deliveries could be adjusted.

As shown in FIG. 39, sales department responds to production engineer. For example, this could be communicated by a message such as the following, in accordance with the present exemplary scenario and embodiment:

"To: J. Smith, Production

From: Sales

One of my customers wanted JIT delivery, but is willing to accept earlier delivery in return for a percentage of the price break we get on power tomorrow. So I can move my delivery date up, and accept your contingency."

Here, information flows back to the coordinator who is still at the power consuming customer.

As shown in FIG. 40, ESCo's special is accepted and aggregate load estimate increases. For example, this could be communicated by a message such as the following, in accordance with the present exemplary scenario and embodiment:

"To: J. Doe, ABC Power

From: J. Smith, XYZ Customer

XYZ Customer will accept ABC Power's special offering for uniform energy tomorrow. See the attached load profile estimate for more details."

Information flow in this Figure is back to the Energy Supplier.

XYZ Customer's production engineer accepts ABC Power's offer. Enough of ABC Power's consumers have accepted the special offer to bring the estimated load profile acceptably close to the supply.

ABC Power's response message to XYZ Customer's production engineer references the estimated cost of power As shown in FIG. 41, production engineer at the power consuming customer site receives acknowledgement of their acceptance of the special rate and updates their schedule. For example, this could be communicated by a message such as the following, in accordance with the present exemplary scenario and embodiment:

"To: J. Smith, XYZ Customer

From: J. Doe, ABC Power

Thank you for taking advantage of our special offer! We estimate that you have saved $10,237.93 (for example) over our regular rates."

This represents feedback to the energy consuming customer.

Scenario 2: Responding to an Emergency:

For example, a hurricane has knocked out some transmission lines. ABC Power's power supplier asks for load shedding. If ABC Power can shed enough load, it might be able to avoid blacking anyone out. ABC Power must impose load shedding on several or all of its customer circles.

ABC Power needs to shed Load. As shown in FIG. 42, for example, this need could be communicated by message such as the following to its power customers, in accordance with the present exemplary scenario and embodiment:

"To: J. Doe, ABC Power

From: ABC Power & Light

Due to the effects of the hurricane, you must bring your power load below 20 Megawatts.

Our apologies for the disruption."

ABC Power tries to give its customers the option of running at reduced power, to avoid a worse situation. It sends each customer a message, which includes a target consumption limit. By prior contract, XYZ Customer has agreed to reduce its consumption to that limit in case of an emergency. The limit is integrated with the estimated usage in the production engineer's portal, and is shown as a dashed red line.

As shown in FIG. 43, ABC Power needs to shed load which, in this exemplary embodiment and scenario, leads to a request by ABC Power for XYZ Customer to shed load. For example, this could be communicated by a message such as the following, in accordance with the present exemplary scenario and embodiment:

"To: J. Smith, XYZ Customer

From: J. Doe, ABC Power

Load Shedding Alert

Hurricane Hydro has taken an unexpected course and damaged transmission capacity in Eastern Texas. We must therefore limit our industrial and commercial load. To avoid surcharges and a possible blackout, please limit power use to the maximum amount shown.

We regret the inconvenience."

Production tries to get consumption down. They ask Sales to revert to the older, low-power schedule.

As shown in FIG. 44, Production Engineer Asks Sales Department About Delaying Order Delivery. For example, this could communicated by a message such as the following, in accordance with the present exemplary scenario and embodiment:

"To: Sales

From: J. Smith, Production

We regret that our power supplier is having problems today. Will your customer accept a delayed delivery or accept only a portion of their order now?

If so, how long could they wait for the remainder?"

However, this doesn't help enough. XYZ Customer has to reduce its power consumption even more.

As shown in FIG. 45, changes to delivery schedule by sales are not enough . . . XYZ Customer Still Needs to Shed More Load. For example, this could be communicated by a message such as the following, in accordance with the present exemplary scenario and embodiment:

"To: J. Smith, Production

From: Sales

I've checked with my customer. Delaying delivery is acceptable to them.

The customer wanted to get the price break unconditionally, but I negotiated an agreement whereby they get a discount only if we do. So feel free to delay production."

For example, Production has another idea—defer equipment tests requiring significant power, and move some more service tasks with small power needs up to today.

As shown in FIG. 46, production engineer asks maintenance engineer to reschedule a task. For example, this could be communicated by a message letter such as the following, in accordance with the present exemplary scenario and embodiment:

"To: Maintenance
From: J. Smith, Production Engineering
Sales was able to delay several deliveries, but we still need to shed more load. Can you delay any machine tests requiring full power, and perform activities with small power requirements for the remainder of today instead?"
Maintenance agrees.
As shown in FIG. 47, information integration provides the solution. For example, the reply from Maintenance" could be communicated by a message such as the following, in accordance with the present exemplary scenario and embodiment:
"To: J. Smith, production
From: Maintenance
No problem. I can delay several tests, and install a software patch on Production Line 2 instead."
With that done, note that XYZ Customer's estimated power consumption is below the limit that ABC Power needs. The crisis eases.
In this exemplary embodiment and scenario, ABC Power customers have shed enough load to bring their (estimated) aggregate load profile below the limit."
As shown in FIG. 48, the projected load shedding results at ABC power could be communicated by a message such as the following, in accordance with the present exemplary scenario and embodiment:
"To: Power & Light Company
From: J. Doe, ABC Power
We project that we will be able to bring our power load below your supply "red line.
Scenario 3: Adapting Energy Use Estimating for the Business Process.
XYZ Customer has underestimated its usage. It is losing more money through penalties than it's saving through rate specials. The comptroller sends the production engineer a message.
As shown in FIG. 49, Underestimation Causes Penalty Charges. For example, this could be the subject of a message such as the following, in accordance with the present exemplary scenario and embodiment:
"To: J. Smith, production
From: Comptroller
Note the power penalty charges. Please improve your estimates."
Production makes a temporary fix. However, he wants to correct the problem permanently. XYZ Customer has outsourced software maintenance to an application service provider (ASP), which is responsible for correcting the business logic used in energy cost estimation
As shown in FIG. 50, production engineer uses power uncertainty information. For example, this could be by a message such as the following, in accordance with present exemplary scenario and embodiment:
"To: Comptroller
From: J. Smith, Production
I've increased the expected error for now. As a permanent solution, I suggest we ask our Application Service provider to change the estimator so the penalties are incorporated into the estimated production cost."

Scenario 4: Better ESCo Side Load Estimates
As shown in FIG. 51, underestimation incurs frequent penalties. For example, this could be the subject of a message such as the following, in accordance with the present exemplary scenario and embodiment:

"To: J. Doe, Load Management
From: Comptroller
The Plastics Customer Circle load exceeds their contract limit quire frequently. Can you improve the load estimates so this does not impact us so often?"
Here the aggregate actual load for the Plastics Customer Circle was above the contracted limit for a considerable period of time as indicated by historical data.
By adjusting the error bounds to a larger interval, the energy supplier can provide themselves with an extra margin of supply. In the longer term, analysts can try to adjust the model for the Plastics Customer Circle to make it more accurate.
As shown in FIG. 52, recomputed error bounds provide reduced risk. For example, this could be[ ]the subject of a message such as the following, in accordance with the present exemplary scenario and embodiment:
"To: Comptroller
From: J. Doe, Load Management
I've recalculated the error bounds for the Plastics Circle. We should probably change the estimator to do this automatically at regular time intervals."
A special software component called a Customer Circle Manager makes decisions about individual customer members of a customer circle while keeping the load profile data and estimates of each consumer organization confidential.
FIG. 53 shows a high level view of the inputs to and outputs from the Customer Circle Manager Software.
Inputs include:
Special Offers for this Customer Circle;
Warnings for this Customer Circle;
Historical Load Profiles;
Near Term Meter Data;
Near Future Load Estimates;
Add Customer;
Delete Customer; and
Update Customer.
Outputs to individual customers include:
Tariffs;
Special Offers; and
Warnings.

Scenario 6: ESCo Supply Side Management
Power Supply managers might use a role-based portal screen that looks like that shown in FIG. 54.
FIG. 54 shows an ESCo Power Supply Management Portal. For example, this could be[ ]the subject of a letter such as the following, in accordance with the present exemplary scenario and embodiment:
"To: WXY Supply Management Desk
From: System
Note the large surplus aggregate energy supply above the aggregate estimated load for tomorrow, Nov. 10, 2000."
Load managers contact supply managers when they determine that they need assistance in adjusting the power supply.
Note the surplus supply and the fact that the average cost of this supply is considerably below the current market price.
Supply managers also monitor market prices and supply levels and may make suggestions to load managers.

Automated Energy Trading.
XML-based automated negotiation is useful in accordance with certain aspects of the invention. In the case of fully automated trading by a small-to-medium scale enterprise (SME), automated energy trading gives SMEs a chance to use the energy markets to decrease their own operating costs. An SME's goal is to optimize the cost of meeting a given schedule. This is practical for customers who don't have attention to spare for energy trading.

The ICE XML framework is one example of an automated negotiation protocol that might be applied for this purpose. The ICE (Information and Content Exchange) XML framework includes an automated negotiation protocol. Although ICE is primarily intended to be used to buy and sell electronic content, the negotiation protocol can be used separately for any purpose. The authors of the ICE standard claim that the protocol is surprisingly robust and can accommodate many different business models.

Other XML-based business negotiation protocols which may exist may be applicable in the context of the present invention.

FIG. 55 shows a Message Sequence Chart (MSC) for an Automated Energy Trading Scenario in the standard Unified Modeling Language (UML). Each vertical line represents a role-player. Messages are passed between role-players.

This scenario represents a straightforward transaction, in which an agent software program is allowed to handle a transaction without human intervention.

This scenario is called "Pick Course CASE 1: Choose a Daily Course Special Tariff ONLY IF doing so reduces—the cost of electricity."For this Case, no changes to the Production Schedule are made.

The role-players and interactions include:
Electricity Supplier offers daily course specials for tomorrow to Consumer Production Engineer's Agent. Electricity supplier [Replace "Electricity supplier" with "Daily course specials for tomorrow"] could be pushed by supplier, or pulled by consumer.
Consumer Production Engineer's Agent selects the subset S of Daily Course Specials that allow completion of tomorrow's schedule;
If S is Not Null Consumer Production Engineer's Agent Selects the daily course special with lowest cost. Call it L.
Consumer Production Engineer's Agent asks Electricity supplier and requests:
If CostOf(L)<CostOf(Default Tariff)? Reserve Lowest Cost Daily Course Special L.
Electricity Supplier replies to Consumer Production Engineer's Agent to Confirm the reservaton, if any, when the requested conditions have been met.
Special Case: Allow Consumer to calculate the cost of actual consumption during any past time period using historical data for an actual production schedule, and a set of daily courses, to compare what costs would have been.

FIG. 56 shows a Message Sequence Chart (MSC) taking one step up the supply chain and adding the energy exchange to the scenario, wherein the energy supplier uses customer load estimates to reduce its risk FIG. 57 shows a scenario in the context of online diagnostic services which shows message passing after a meter has sent an error message to the DisCo FIG. 58 shows a scenario in the context of online diagnostic services showing monitoring with anomaly diagnosis and notification to a customer. In this scenario, there is no error message. Rather, the DisCo deduces the problem from anomalous behavior of the metering data.

It will be understood that the present invention is preferably implemented using programmable digital computers and/or special purpose dedicated computers, as may be convenient and appropriate. It is contemplated that such a system may make use of electronic information exchange, optionally including communications on the Internet, World Wide Web, e-Business networks, intranets, wireless nets, local area networks, and similar facilities.

The technology available for implementation is extensive and may include, without limitation any of:
Web technology: Portals, VPNs and extranets, messaging technology (MAPI, CDF) XML family technologies and standards such as
  NERC defined XML schemas for the electric power industry
  EDI standards in the energy domain: XML/ED1, X12/XML, EDI 867, etc.
  SWAP, NIST, PIF-XML workflow and process schemas
  Commerce schemas: BizTalk, ICE, ecXML, OTP, etc.
  Handhelds, palmtops, and wireless (mostly for plant floor control): WML wherein:
CDF=Channel Definition Format—an XML—based push technology
cXML=Commerce XML
ecXML=Electronic Commerce XML (UN/CEFACT initiative)
MAPI=Mail API
NERC=National Energy Research Council
OTP=Open Trading Protocol
SWAP=Simple Workflow Access Protocol
WAP=Wireless Application Protocol
WML=Wireless Markup Language (both XML and WAP)
XML=eXtensible Markup Language White the invention has been described and illustrated by way of exemplary embodiments, such examples and embodiments are not intended to be limiting of the scope of the invention but are intended to be helpful to gaining a fuller understanding of the nature and operation of the invention. As one of skill in the art to which the invention pertains will understand, various changes and modifications may be made without departing from the spirit of the invention. For example, while the exemplary embodiments relate primarily to electrical supply utilities and consumers, the invention is applicable to any parallel situation wherein the commodity is a water supply, fuel gas supply, or the like and the invention should so be understood to be applicable to such utilities.

What is claimed is:

1. A business management system with interaction between an electrical energy supplier and a plurality of customer energy consumers having respective electrical load units which consume electrical power while producing goods according to production schedules, said system comprising:
  a Web site operated by said electrical energy supplier for providing information to customers about daily courses of energy supply reliabilities and energy prices offered for the morrow through a customer portal site;
  Web browser means available to respective ones of said customer energy consumers for accessing said customer portal site;
  computer means for generating a set of lowest cost goods production schedules for one or more of said daily courses, taking into consideration historical electricity use data by each of said electrical load units, inventory information corresponding to materials needed to produce the goods, and a list of said customer energy consumers' pending orders for goods to be produced; and
  means for comparing said schedules and presenting information thereon on said Web browser to an operator for enabling a goods production scheduling judgment based selection of a desirable schedule.

2. A business management system with interaction between an electrical energy supplier and a plurality of customer energy consumers having respective electrical load units which consume electrical power while in a productive mode of operation for producing goods according to production schedules and whereof a subset requires maintenance with varying degrees of urgency, said system comprising:

a Web site operated by said electrical energy supplier for providing information to customers about daily courses of energy supply reliabilities and energy prices offered for the morrow through a customer portal site;

Web browser means available to respective ones of said customer energy consumers for accessing said customer portal site;

computer means for generating a set of lowest cost goods production schedules for one or more of said daily courses, taking into consideration historical electricity use data by each of said electrical load units, inventory information corresponding to materials needed to produce the goods, and a list of said customer energy consumers' pending orders for goods to be produced; and means for comparing said schedules and presenting information thereon on said Web browser to an operator for enabling a goods production scheduling judgment based selection of a desirable schedule and, in the event that a low cost power is available from said electrical energy supplier, selectively postponing maintenance on electrical load units subject to said degree of urgency so as to allow selected ones of said electrical load units to operate in said productive mode of operation while said low cost power continues to be available.

3. A business management system with interaction between a utility supplier, said utility comprising any of electricity, water supply, and fuel gas, and a plurality of customer utility usage consumers having respective utility usage load units which consume from said utility while in a productive mode of operation for producing goods according to production schedules and whereof a subset requires maintenance with varying degrees of urgency, said system comprising:

a Web site operated by said utility supplier for providing information to customers about daily courses of energy supply reliabilities and energy prices offered for the morrow through a customer portal site;

Web browser means available to respective ones of said customer utility consumers for accessing said customer portal site;

computer means for generating a set of lowest cost goods production schedules for one or more of said daily courses, taking into consideration historical utility usage data by each of said utility usage load units, inventory information corresponding to materials needed to produce the goods, and a list of said customer utility usage consumers' pending orders for goods to be produced; and means for comparing said schedules and presenting information thereon on said Web browser to an operator for enabling a goods production scheduling judgment based selection of a desirable schedule and, in the event that a low cost for said utility is available from said utility supplier, selectively postponing maintenance on utility usage load units subject to said degree of urgency so as to allow selected ones of said utility usage load units to operate in said productive mode of operation while said low cost for said utility continues to be available.

\* \* \* \* \*